United States Patent [19]
Karkhanis et al.

[11] Patent Number: 6,085,296
[45] Date of Patent: Jul. 4, 2000

[54] SHARING MEMORY PAGES AND PAGE TABLES AMONG COMPUTER PROCESSES

[75] Inventors: Nitin Y. Karkhanis, Nashua; Karen Lee Noel, Pembroke, both of N.H.

[73] Assignee: Digital Equipment Corporation, Maynard, Mass.

[21] Appl. No.: 08/968,238

[22] Filed: Nov. 12, 1997

[51] Int. Cl.[7] .................................................. G06F 12/08
[52] U.S. Cl. ................................... 711/147; 711/206
[58] Field of Search .................................. 711/206, 207, 711/208, 209, 147, 148, 150, 151, 152, 153, 163

[56] References Cited

U.S. PATENT DOCUMENTS

| | | | |
|---|---|---|---|
| 4,669,043 | 5/1987 | Kaplinsky | 711/3 |
| 4,758,951 | 7/1988 | Szwyter, III | 711/206 |
| 4,991,082 | 2/1991 | Yoshizawa et al. | 711/209 |
| 5,274,811 | 12/1993 | Borg et al. | 395/704 |
| 5,652,854 | 7/1997 | Wong | 395/416 |
| 5,873,127 | 2/1999 | Harvey et al. | 711/206 |
| 5,893,166 | 4/1999 | Frank et al. | 711/163 |

*Primary Examiner*—Do Hyun Yoo
*Assistant Examiner*—Gary J. Portka
*Attorney, Agent, or Firm*—Cesari and McKenna, LLP

[57] ABSTRACT

A method of managing computer memory pages. The sharing of a program-accessible page between two processes is managed by a predefined mechanism of a memory manager. The sharing of a page table page between the processes is managed by the same predefined mechanism. The data structures used by the mechanism are equally applicable to sharing program-accessible pages or page table pages.

42 Claims, 12 Drawing Sheets

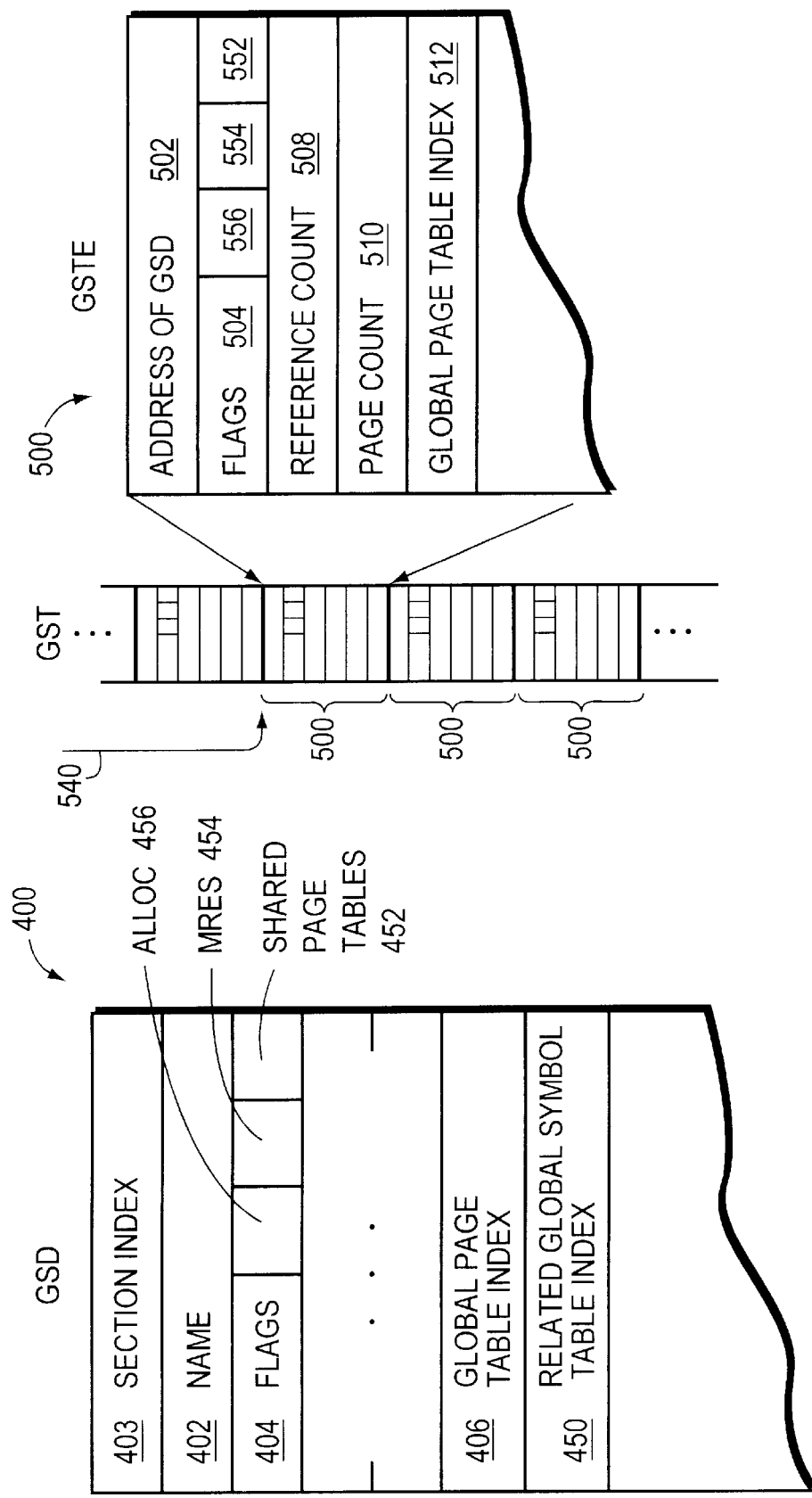

SHARING MEMORY PAGES AND PAGE TABLES AMONG COMPUTER PROCESSES

BACKGROUND

The present invention relates to sharing memory among computer processes.

A virtual memory system automatically moves a program's data back and forth between slower, lower-cost secondary memory and faster, higher-cost, primary memory, so that the program's more-referenced data tend to reside in the faster memory, and less-referenced data tend to reside in the slower memory. A program's data are divided into fixed-size blocks, called "pages." More-referenced pages are kept in primary storage. As references to the page become less frequent, the less-referenced page is moved to secondary storage. In a computer with a virtual memory system, programs reference data by virtual address. Address translation hardware translates program-visible virtual addresses to physical addresses (a physical address is the address in primary memory at which the data actually reside).

The translation from virtual addresses to physical addresses is called the "mapping," and is described by a "page table," a table that associates pages of virtual addresses to pages of physical addresses. The page table is itself divided into pages. The pages of the page table are typically arranged as a tree, with a base pointer forming the root at the top of the tree, higher-level nodes in the tree indicating the mapping at coarser level, and lower-level nodes in the tree indicating the mapping at finer levels. The memory pages actually read, written, and executed by programs form the leaf nodes at the bottom of this tree.

Virtual memory systems and multi-level address translation are described in "Structured Computer Organization," second edition, by Andrew S. Tanenbaum, Prentice-Hall, 1984, "VAX/VMS Internals and Data Structures," by Lawrence J. Kenah and Simon F. Bate, Digital Press, 1984, "OpenVMS AXP Internals and Data Structures, Version 1.5" by R. Goldenberg ad S. Saravanan, Digital Press, 1994, "Extending OpenVMS for 64-bit Addressable Virtual Memory," Digital Technical Journal vol. 8 no. 2 (1996), and "Alpha AXP Architecture Reference Manual," second edition, by Richard L. Sites and Richard T. Witek, Digital Press, 1995, each incorporated herein by reference.

It is known to provide shared memory among multiple processes executing on a computer. In a typical implementation, two processes agree on the physical page number in which the shared data are stored, and the page tables of the two processes are each set to point to that agreed physical page.

SUMMARY

In general, in a first aspect, the invention provides a method of and a system for sharing memory among processes in a computer. The sharing of a program-accessible page between two processes is managed by a predefined mechanism of a memory manager. The sharing of a page table page between the processes is managed by the same predefined mechanism. The data structures used by the mechanism are equally applicable to sharing program-accessible pages or page table pages.

In a second aspect, the invention features a program-accessible page stored in a computer memory, shared among two processes. A translation page is stored in the memory, describing a virtual-to-physical address mapping for memory references, and the translation page is shared among the two processes. A memory manager manages the program-accessible page and the translation page, using common mechanisms for managing the sharing among the processes of the program-accessible page and the translation page.

In a third aspect of the invention, a global section and its page table structure are shared among multiple processes. For a global section that uses a multi-level shared page table structure, a single programmatic reference can be used to create and manage both the leaf global section and the global section for the page table structure.

Embodiments of the invention may include one or more of the following features. Page tables shared using the predefined mechanism may inhabit several levels of a multi-level address page table tree. The shared page table pages may be pageable between primary and secondary memory, or the page table pages may be locked into primary memory. The shared program-accessible page may be pageable or locked. The memory manager may enforce a discipline in which the highest-level page table page shared among the processes may be locked into the primary level of the memory. The first and second data structures may be created responsive to a single entry in a memory reservation request. The shared page table pages may be mapped into address spaces of the plurality of processes. The sharing processes may use a single name to refer collectively to the first and second data structures in system service requests. The single name may be stored in the first data structure. The first and second data structures may each be instantiated as a pair of corresponding subsidiary data structures, each member of each pair including a reference for locating the other member of the pair. A memory manager may move the contents of the shared page table entries and the shared data pages between primary and secondary memory, for instance a disk drive. The program-accessible page may be allocated by a non-privileged process from a pool of memory reserved out of the system page pool and designated as non-pageable. Memory from the reserved pool may be allocated in groups of contiguous physical pages, or may be allocated page-by-page on page fault. Allocation may enforce an address alignment of the program-accessible page to greater than page alignment, for instance based on a length of an allocation or mapping request. An allocation or mapping request to a shared memory object that violates the alignment constraint may be mapped with process-private page tables. The shared page table page may have encoded in a single entry in the page table page a mapping corresponding to multiple entries of the page. A region of virtual memory may be attributed with a property that that memory objects mapped into the region will be mapped with shared page table pages. An implementation may refuse to map private memory objects using the shared page table page. The size of a page table section embracing the shared page table page may be determined from the size of an allocation request for a group of leaf pages.

Specific embodiments of the invention may offer one or more of the following advantages.

Performance of Very Large Memory (VLM) systems (computer systems with over 4 GB of main memory, requiring more than 32 bits of addressing) is improved. VLM applications typically consume large amounts of physical memory in an attempt to minimize disk I/O and enhance overall application performance. A VLM system allows large amounts of data to remain resident in main memory, thereby reducing the time required to access that data. For example, database cache designers implement large-scale caches on VLM systems to improve the access times for database records. Similarly, VLM database applications support more server processes. The combination of large in-memory caches and increased number of server processes significantly reduces the overall time database clients wait to receive the data requested.

Users of VLM systems can memory map very large shared memory objects (gigabytes in size) that use a multi-level shared page table structure to create and access the shared memory with a single handle. Users are not required to make major changes to their applications to take advantage of the invention. Instead, the original shared memory object handle name encoded in the application can be used to create and access shared memory that will exhibit better physical memory and CPU utilization characteristics. VLM objects exhibit the same basic characteristics (from the programmer's perspective) as other virtual memory objects created with conventional service programming interfaces. Implementations may choose not to charge the shared memory object or its page tables against a users page quota, reducing the risk of unanticipated exhaustion of working set or page file quota. Program start-up times are reduced. The time required for multiple users to map the same object is reduced. The improved management of memory improves performance when multiple VLM applications are run on a single system.

Shared memory objects with shared page tables exhibit better physical memory and CPU utilization since the page table structure that maps the shared memory is also shared among the processes that wish to access the shared memory. Significant processor time is saved in creating and deleting virtual address mappings to those shared memory objects. Contention is reduced for the locks serializing access to memory management data structures. There is a savings in physical memory required for the process private page tables that map shared memory object for each process mapping the object. More concurrent users may access each shared memory object, with less risk of exhausting computer memory resources. More processes may be simultaneously resident in memory, reducing process swapping. The physical memory cost of creating and maintaining private page tables for multiple mappers of the same object is reduced. The use of a backing storage file for shared page tables pages is reduced. Working set list accounting for these page table pages is reduced. The design allows upper levels of the page table hierarchy to be shared. By sharing leaf pages and page table pages using common mechanisms, the creation of new privileges or access rights is reduced. There is less impact on users who do not use shared page tables.

System management of a VLM system is simplified. A Reserved Memory Registry may support memory reservations for memory-resident global sections and shared page tables.

The Reserved Memory Registry provides a physical memory reservation system that : can be exploited by VLM applications. The Registry provides portions of the system's physical memory to non-privileged processes. A non-privileged process can request physical memory to make the most efficient use of system components. This reservation of physical memory may, in turn, improve utilization of the translation buffer. More efficient use of the CPU and its peripheral components leads to increased application performance. Shared memory objects may be created that do not page to disk.

The invention may simplify the creation and mapping of a shared memory object that utilizes a shared multi-level page table structure by enabling only a single handle to specify both the shared memory leaf object and the correspondent shared page tables. The system determines whether the shared leaf object can be created with shared page tables, and secondarily, by applying certain mapping criteria, whether the object can be mapped into a user's address space using shared page tables. The user has the option of adhering to or violating the mapping criteria as a means to control whether the shared memory object is mapped using shared page tables or process private page tables.

The following table highlights the physical memory requirements for private page tables that map to various sizes of global sections by various numbers of processes. This table illustrates the amount of physical memory saved system wide through the use of shared page tables. (All of the figures assume a system page size of 8 Kbytes.)

TABLE 1

Memory Requirements For Private Page Tables

| Number of Mapping Processes | Global Section Size | | | |
|---|---|---|---|---|
| | 8 Kbytes | 8 Mbytes | 8 Gbytes | 1 Tbyte |
| 1 | 8 Kbyte | 8 Kbyte | 8 Mbytes | 1 Gbyte |
| 10 | 80 Kbytes | 80 Kbytes | 80 Mbytes | 10 Gbytes |
| 100 | 800 Kbytes | 800 Kbytes | 800 Mbytes | 100 Gbytes |
| 1000 | 8 Mbyte | 8 Mbyte | 8 Gbytes | 1 Tbyte |

It is not intended that the invention be summarized here in its entirety. Rather, further features, aspects and advantages of the invention are set forth in or are apparent from the following description and drawings.

BRIEF DESCRIPTION OF THE DRAWINGS

FIGS. 4, 5, 6, and 7 are diagrams showing data structures from an implementation of shared page table pages and leaf pages.

DETAILED DESCRIPTION

Figure 1:
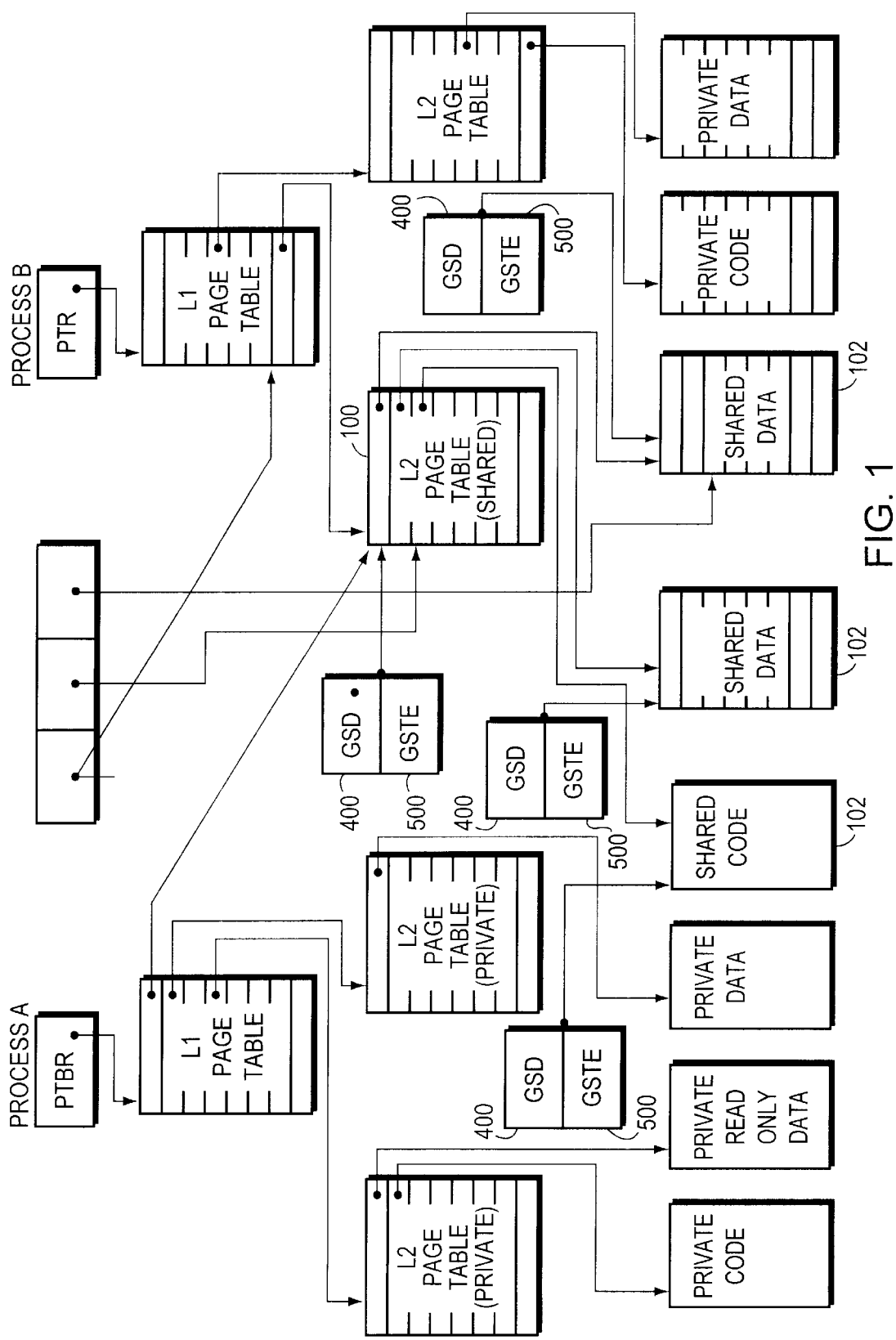
FIG. 1 is a block diagram showing data structures and address translation in a computer, showing shared page tables and shared leaf pages.

Referring to FIG. 1, when multiple processes share data, the virtual memory address translation page tables 100 are also shared. The virtual memory manager manages the page table pages 100 as well as the leaf data/code pages 102, paging them between primary and secondary memory. The page table pages 100 are managed and shared using the memory management and sharing machinery already developed for managing and sharing the leaf pages 102 (with relatively small changes and additions), rather than by a dedicated management and sharing systems developed specifically to manage and share the page table pages. The data structure 400, 500 type used to manage shared leaf pages is the same as the type used to manage shared page table pages 100. Because virtual memory management systems are central to the performance of a modern computer, some implementations have become highly developed and optimized. For instance, a modern virtual memory manager may provide several different management policies tuned to different usage patterns of the leaf data, and may further provide automatic monitoring and policy selection to dynamically optimize the management of the pages. Similarly, these systems have developed advanced systems for sharing data pages 102. By managing and sharing the shared page table pages and the shared leaf pages by common machinery 400, 500, the benefits of the developed machinery can be leveraged to provide benefits in managing the page table pages 100 as well.

Figure 2:
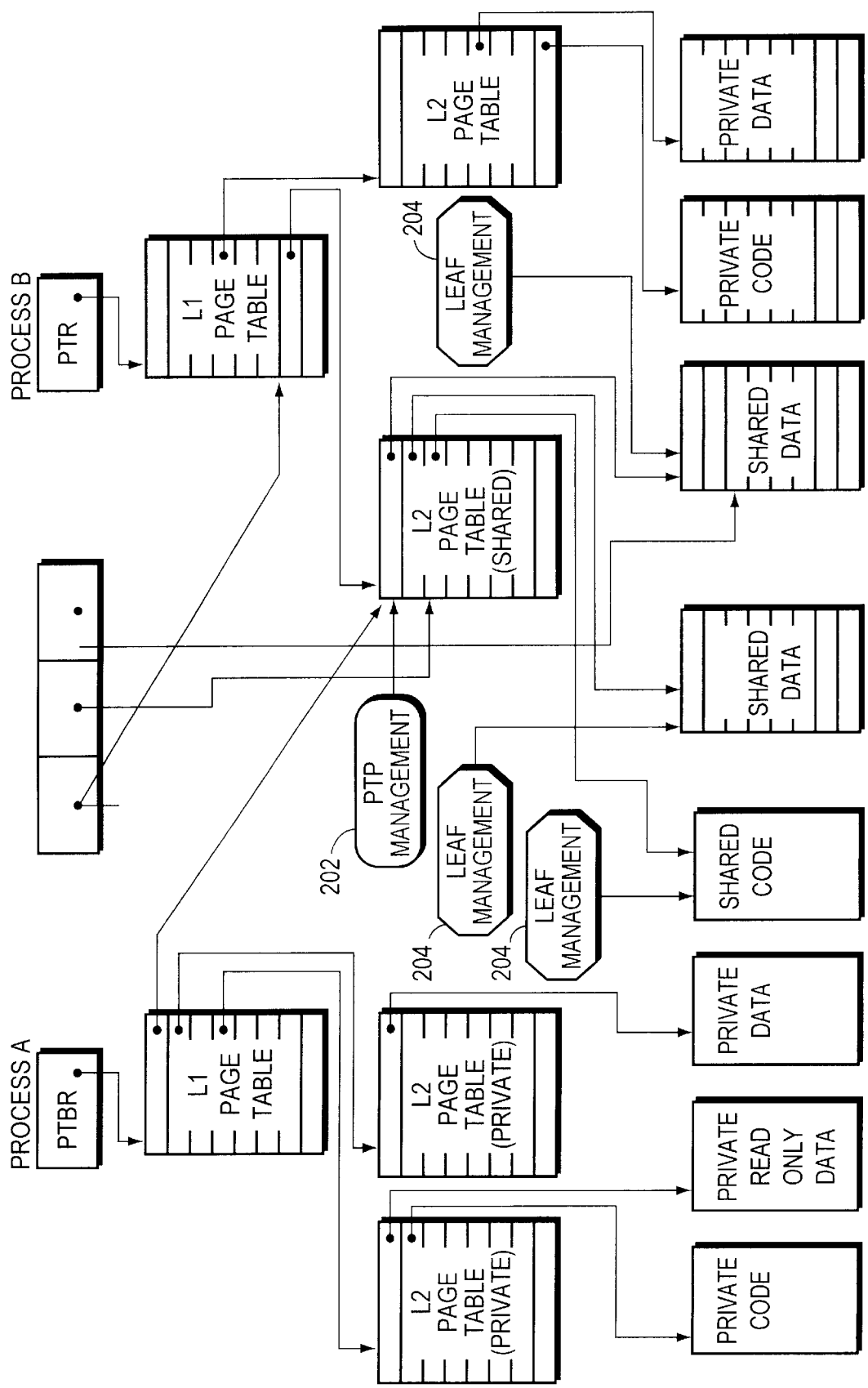
FIG. 2 is a block diagram of a prior art implementation of shared page tables and leaf pages.

The invention offers a contrast to known methods of managing and sharing page table pages. As shown in FIG. 2, known systems if they share page tables at all, share them using different machinery. For instance, the sharing of page table pages is managed by data structures 202 of one data type, and sharing of leaf pages is managed by data structures 204 of another.

An application may require that a portion of its memory be locked down, that is, that the pages of the locked section not be paged to disk, but rather be kept permanently resident in memory. When a VLM application requests large amounts of locked memory, system tuning can be adversely affected. Once the pages have been locked, the system may no longer have enough free pages to support the number of processes it was configured to support.

The operating system supports the idea of reserving memory for use by VLM applications. Reserved memory is removed from consideration by system tuning algorithms so that a VLM application, when it uses reserved memory, does not interfere with the paging dynamics of the running system.

Multiple VLM applications may be run within one system.

During the operation of the running system, if an application reduces its need for reserved pages, the pages can go to waste unless there is a mechanism to reclaim these pages by the system. System performance is improved if these pages are made available to the system, especially if the system is retuned to take these pages into account.

In a modern computer architecture, for instance, the Alpha architecture of Digital Equipment Corporation, allows multiple contiguous pages to be treated as a single huge page—a single page table entry and translation buffer entry are marked as controlling address translation for many pages. This improves the translation buffer hit rate, which improves performance. To use the Alpha "huge page" feature, granularity hint bits are set within page table entries that map contiguous physical pages. To guarantee that contiguous physical pages are available to an application, contiguous pages may be set aside during system startup. These pages are called reserved physical pages. Reserved physical pages are locked down and do not page to disk.

A translation buffer (TB) is a CPU component that caches recent virtual-to-physical address translations of valid pages. The TB is a small amount of very fast memory and therefore is only capable of caching a limited number of translations. Each entry in the TB represents a single successful virtual-to-physical address translation. TB entries are purged when either a request is made by software, or when the TB is full and a more recent translation needs to be cached.

A computer system can make more effective use of the translation buffer by allowing several contiguous pages (groups of 8, 64, or 512 pages) to act as a single huge page. This single huge page is called a granularity hint region and is composed of contiguous virtual and physical pages whose respective first pages are aligned according to the number of pages in the region. When the conditions for a granularity hint region exist, the single huge page is translated by a single TB entry instead of several. Minimizing the number of entries consumed for contiguous pages greatly reduces turnover within the TB, leading to higher chances of a TB hit. Increasing the likelihood of a TB hit in turn minimizes the number of virtual-to-physical translations performed by the CPU.

Since memory-resident global sections are non-pageable, mappings to memory-resident global sections greatly benefit from exploiting granularity hint regions. The Reserved Memory Registry guarantees that a contiguous set of properly-aligned physical pages, can be located to exploit the granularity hint feature.

Reserved physical pages used by an unprivileged application are zeroed prior to allowing the application to access the memory, for security reasons. When a very large amount of reserved physical memory is used, the time taken to zero the memory can degrade application and system performance.

The Reserved Memory Registry offers further advantages in controlling a virtual memory system. For instance, the Registry allows large amounts of memory set aside for use within memory-resident sections. The Reserved Memory Registry also allows a system to be properly tuned before system initialization, taking into account the pre-allocated reserved memory. With the Reserved Memory Registry, a system administrator can reserve a large block of contiguous, aligned pages from the fluid demand-paged page pool for use in locked memory object. The reserved pages can either be allocated in large chunks to satisfy alignment constraints, or may be allocated page by page on demand. The Reserved Memory Registry provides the ability to specify that the pre-allocated pages are to be zeroed during the booting of the system. This option reduces the time required to create the memory-resident global demand-zero section. The Reserved Memory Registry also allows the system administrator to specify that shared page tables are to be used for a particular memory object; the Registry may then reserve appropriate memory to allocate to the page tables for the Reserved object.

In this disclosure, the word "region" generally means a range of virtual addresses, possibly with no physical memory mapped into it. A "section" is a collection of physical pages managed as a group by the operating system. The word "object" is generally intended to generically embrace "regions" and "sections", and other resources managed by the memory manager. A "global section" is a section that can be simultaneously shared in several processes' address spaces.

The features provided by embodiments of the invention are described in section I. The system data structures are described in section II. The operation of the system is described in section III. The Reserved Memory Registry is described in section IV.

I FUNCTIONAL DESCRIPTION

A computer and operating system with 64-bit addressing, such as OpenVMS Alpha of Digital Equipment Corporation, supports very large address spaces. A conventional computer, with 32 bits of addressing, supports address spaces of 4 GB; OpenVMS supports address spaces of 8 TB (2000 times as large), with the majority of the address space dedicated to process use. Users have the ability to subdivide the address space into manageable chunks called virtual regions. Virtual regions are simply reservations within the address space; they do not represent allocated or created virtual memory. A user creates a section and maps storage to a virtual region before accessing the addresses within the virtual region.

Virtual regions are aligned to a page-aligned virtual address and their lengths are always a multiple of the number of bytes in a page. Upon successful creation of a virtual region, the user is returned a handle that is in turn passed to the system service routines that create virtual address space.

Shared page tables are implemented as sections. A leaf section mapped by a shared page table section is aligned to a page table page boundary and its lengths are a multiple of the number of bytes in a page. Shared page table sections are used when a process wants to map or attach to a global section that has an associated set of shared page tables.

I.A MEMORY-RESIDENT GLOBAL SECTIONS

A global section may be defined to be memory-resident, that is, that it will not be paged. Locked global sections are indicated by a flag in the section's global section table entry and global section descriptor when the section is created. This flag tells the system that the section is a memory-resident section and that mapped pages are not charged against any process or the system's pagefile quota and when faulted, are not placed into the process's working set.

Memory-resident global sections have no backing pagefile nor are they backed by any other file on disk. Thus, no pagefile quota is charged to any process or charged to the system. When a process maps to a memory-resident global section and references the pages, working set list entries are not created for the pages; thus no working set quota is charged to the process.

A user may specify that a memory-resident global section is "demand zero" (DZRO), that it is to be initialized with zero contents. A demand-zero section may have one of two attributes: either ALLOC, that all pages are allocated and mapped when the section is created, or FAULT, that pages will be allocated and mapped on demand as they are touched by a process. It is recommended that the pages within a memory-resident global section be deducted from the system's fluid page count through the Reserved Memory Registry, as discussed in section IV. Using the Reserved Memory Registry ensures that the system is properly tuned to exclude memory-resident global section pages from its calculation of the system's fluid page count. This tuning sizes the system pagefile, number of processes, and working set maximum size based on the system's fluid page count.

If memory has been reserved using the Reserved Memory Registry, that memory must be used for the global section under whose name it is reserved. To return the memory to the system, SYSMAN can be run to free the reserved memory, thus returning the pages back into the system's count of fluid pages.

I.B THE FAULT AND ALLOC OPTIONS

To initialize a very large memory-resident global section mapped by several processes, the overhead of hardware faults, allocating zeroed pages, setting process PTE's valid, and setting GPTE's valid is reduced by pre-allocating the physical pages for the memory-resident global section. This pre-allocation is done via the Reserved Memory Registry. A demand-zero memory-resident global section may either be managed under the FAULT policy (in which unaccessed pages within the global section remain fluid within the system, and are only bound to the section when touched), or under the ALLOC policy (in which pages are allocated and zeroed at system initialization or during system idle times). When the FAULT (or fault) option is used, processes or the system can use the physical pages until they are accessed. The pages remain within the system's "fluid" memory until they are needed. When the memory-resident global section is deleted, the pages are returned to the system. When the ALLOC option is used, contiguous pages are set aside during system startup specifically for the memory-resident global section.

One routine call to the Reserved Memory Registry is made to determine the range of pages pre-allocated for the memory-resident global section or to determine if the FAULT option can be used. Therefore the decision to use the FAULT or the ALLOC option is not made within the system services routine interface. The system manager can determine which option is used through the Reserved Memory Registry.

When a section is created with the ALLOC option, physical memory page frames are pre-allocated during system initialization time. Reserving a large pool of contiguous pages allows a memory allocation request to be satisfied by contiguous pages, properly aligned, to exploit the "granularity hints" feature of address translation hardware. The "map section" (possibly called as a sub-service of the "create and map" service) service will map portions of virtual address space to physical memory, in chunks of 8, 64, or 512 contiguous pages, with preference given to chunks of larger alignment. The size and alignment factor are chosen by examining the number of low-order zeros of the size of the mapping request, and choosing the largest granularity hint available for that alignment of size. The memory-resident global section size must be less than or equal to the size of the reserved memory or an error is returned from the "create section" system service call.

The SYSMAN system command is provided to manage the Reserved Memory Registry (RMR). If memory is reserved using the RMR, it is given a name by which programs can access the reserved memory. To return the memory to the system, SYSMAN can be run to free the pre-reserved memory back into the system's fluid page pool. Once the pre-reserved memory has been freed, the allocate option can no longer be used to create the memory-resident global section.

I.C SHARED PAGE TABLES

Shared page tables enable two or more processes to map to the same physical pages without each process incurring the overhead of page table construction, page file accounting, and working set quota accounting. Internally, shared page tables are treated as a special case of the general management of global sections. A special global section that provides page table sharing is called a shared page table section. In OpenVMS 7.1, shared page table sections themselves are memory-resident, though this is not a requirement of the invention.

The shared page tables are implemented using the same data structures and mechanisms used to manage the leaf pages of a process. These data structures and mechanisms will be described in sections II and III, below.

The MEM_RESIDENT_USER right is required to initially create a memory-resident global section, including a shared-page-table section. Once the section is created, processes that do not have this right can connect to existing memory-resident sections.

If the leaf section is memory-resident, then the shared page tables must be memory-resident. Memory for memory-resident shared page tables is obtained from the Reserved Memory Registry, using the name of the leaf section it maps.

I.D OPERATING SYSTEM SERVICES

The operating system provides several services to create new and map to existing global sections and virtual regions.

The Create Virtual Region service SYS$CREATE_REGION reserves virtual address space within a process' address space. Once a virtual region has been created, virtual address space can be created within it using the system services that accept a region identifier argument. Note that the virtual region is simply a reservation of virtual address space. No physical memory is occupied for a virtual region until virtual address space is created within the region.

The Create Permanent Demand-Zero Global Section SYS$CREATE_GDZRO service creates a permanent memory-resident demand-zero global section. Global demand-zero sections contain demand-zero allocation pages that are writable and are memory-resident, without disk backing store. The section is "permanent" in that the section and the data it contains persist even when no process is attached to the section. The global pages are not charged against any pagefile quota.

The Create and Map Global Demand-Zero Section SYS$CRMPSC_GDZRO service creates a section and maps memory-resident global demand-zero pages in a previously-created region. If the "name" specifies a global section that already exists, the service maps to it only if it is a memory-resident global section. All pages in the memory-resident global section are shared by all processes that map to the global section.

The Map Global Section SYS$MGBLSC service maps a process' virtual address space to a global section, for instance a memory-resident section, a disk file, page file, or a demand-zero section. If a global section backed by a disk file or page file is being mapped, invalid page table entries are placed in the process page table. If a memory-resident global section is being mapped, and the section was registered in the Reserved Memory Registry and /ALLOCATE was specified when the section was registered, valid page table entries are placed in the process page tables.

The arguments to these calls typically include a subset of the following:

name—The string name of the global section to be allocated.

length—the length of the object to be created. The present implementation requires that the length be an integral number of pages. The system may round this up to the number of bytes mapped by a page table page.

prot—the protection to be associated with the created region or section.

flags—flags as indicated in table 2, below.

start_va—If specified and non-zero, the starting address for the created region, or the address at which to map the section. The specified virtual address is a CPU-specific page-aligned address, subject to limitations on use of the address space imposed by the operating system. In a region creation call, if the flag SHARED_PTS is set and this argument is specified, the specified starting address must be aligned to a natural page table page boundary or an error is returned. If /ALLOCATE was specified when the memory-resident global section was registered in the Reserved Memory Registry, and start_va is sufficiently aligned (8 pages, 64 pages or 512 pages) to take advantage of granularity hint, granularity hints are used to map to the global section.

region_id—for create-section and map-section calls, the region ID returned from a prior call to SYS$CREATE_REGION, the reserved space into which to create a section.

ident—Identification value specifying the version number of the global section.

section_offset—for a mapping call, the offset into the global section to start mapping into the process's virtual address space. The offset specified must be a multiple of (CPU-specific page size, or page table page alignment is the region i.d. specifies a shared page table region.

map_length—in a mapping call, the length of the global section to be mapped. The length specified must be a multiple of CPU-specific pages.

The values returned from these calls typically include:

return_region_id—returned from SYS$CREATE_REGION: the region ID associated with the created region, to be used as a parameter to future section creation and mapping calls.

return_va—In a region-creation call, the virtual address of the base of the region. If the flag SHARED_PTS is set, the returned virtual address is aligned to a CPU-specific page table page boundary. If the global section mapped by this shared page table region is large enough that multiple page table pages are required to map the global section, the page tables themselves may be mapped with granularity hints. Therefore, the alignment of the returned virtual address may be even greater than that of a single CPU-specific page table page boundary.

return_length—The length of the region actually created or the section mapped. For SYS$CREATE_REGION, if the flag SHARED_PTS is set, the returned length is the input length rounded up to an even multiple of bytes mapped by a single CPU-specific page table page.

TABLE 2 flags to region and section creation services

| Flag | Description |
|---|---|
| SHARED_PTS | Created region requires the virtual address space created within it to be capable of using shared page tables. If this flag is not specified, the virtual address space created within the region is mapped by process-private page tables only. By default, the region does not allow the use of shared page tables. |
| EXPREG | Pages are mapped into the first available space at the first free virtual address of the specified region. If region_id specifies a shared page table region, virtually aligned addresses after the first available space are chosen for the mapping. |
| NO_OVERMAP | Pages cannot overmap existing address space. |
| PERM | Pages are permanent and the section persists, though unmapped, during times that no process maps it. |

Both the start virtual address and offset of the region or section must be a multiple of the amount of memory mapped by a page table page, at least in a system that does not allow for sharing part of a page table page. The size of the region must be a multiple of the amount of memory mapped by a page table page. The size of a section must be at least page aligned. Since each page table entry maps 8 KB and there are 1024 page table entries per page table page, this means that base addresses and sizes for objects with shared page tables must be multiples of 8 MB.

In one exemplary embodiment, when using shared page tables, the leaf pages will be locked into memory, though this is not necessary in all possible embodiments.

If a memory-resident global section with shared page tables is mapped into a virtual region that does not have the shared page table attribute, the global section is mapped with process private page tables. Other address space creation services will not be allowed to create address space into a shared page table region since they have an implicit dependency on process private page tables.

On a mapping call, if /ALLOCATE was specified when the global section was registered in the Reserved Memory Registry, contiguous, aligned physical pages are pre-allocated during system initialization for this global section. Valid page table entries are placed in the global page table and valid page table entries are placed in the process page table. If the reserved pre-allocated memory is smaller than the size of the global section, the napping call returns an error status, and the global section is not created. With the proper virtual alignment, granularity hints are used to map to the global pages.

A section will be mapped with shared page tables only if both the global section was created with shared page tables, and the region in which the section is mapped also specifies shared page tables.

Whenever granularity hints are being used to map a memory-resident global section, if the "length" argument is not an exact multiple of the alignment factor, lower granularity hint factors are used as appropriate at the higher addressed portion of the global section.

The two section creation services, SYS$CRMPSC_GDZRO and SYS$CREATE_GDZRO, each return a system status indicating that the service completed normally, or that the section was created with shared page tables. Or, the status may indicate an error: for instance, that the request seeks to create an object with a name already in use, that the specified name is too long, that the process does not hold a required access right, that the supplied flags were inconsistent, that an address argument is insufficiently aligned, that one of the return arguments could not be written by the service, that the address space is full or that a quota is exhausted, that one of the system tables is full, that an address requested for allocation is already allocated or otherwise unavailable, that the allocation request would exhaust the system's supply of fluid pages, that the requested size for a section exceeds the size previously allocated for its containing region, or that the properties for a requested section do not match the properties of the region in which allocation is sought.

On a mapping call, if a newly-allocated global section is either not registered in the Reserved Memory Registry or /NOALLOCATE was specified when the global section was registered in the Reserved Memory Registry, invalid global page table entries are written to the global page table. In these cases, when the global section is mapped, invalid page table entries are placed in the process page table. Physical memory is not allocated until the pages are referenced.

If private page tables are used to map to a memory-resident global section, the working set quota and pagefile quota of the process must be sufficient to accommodate the increased size of the process page tables required by the increase in virtual address space.

Other system services allow a process to query for the number of pages mapped by one page table page, and to delete global sections.

I.E SHARED PAGE TABLES FOR PAGEABLE GLOBAL SECTIONS

Figure 3:
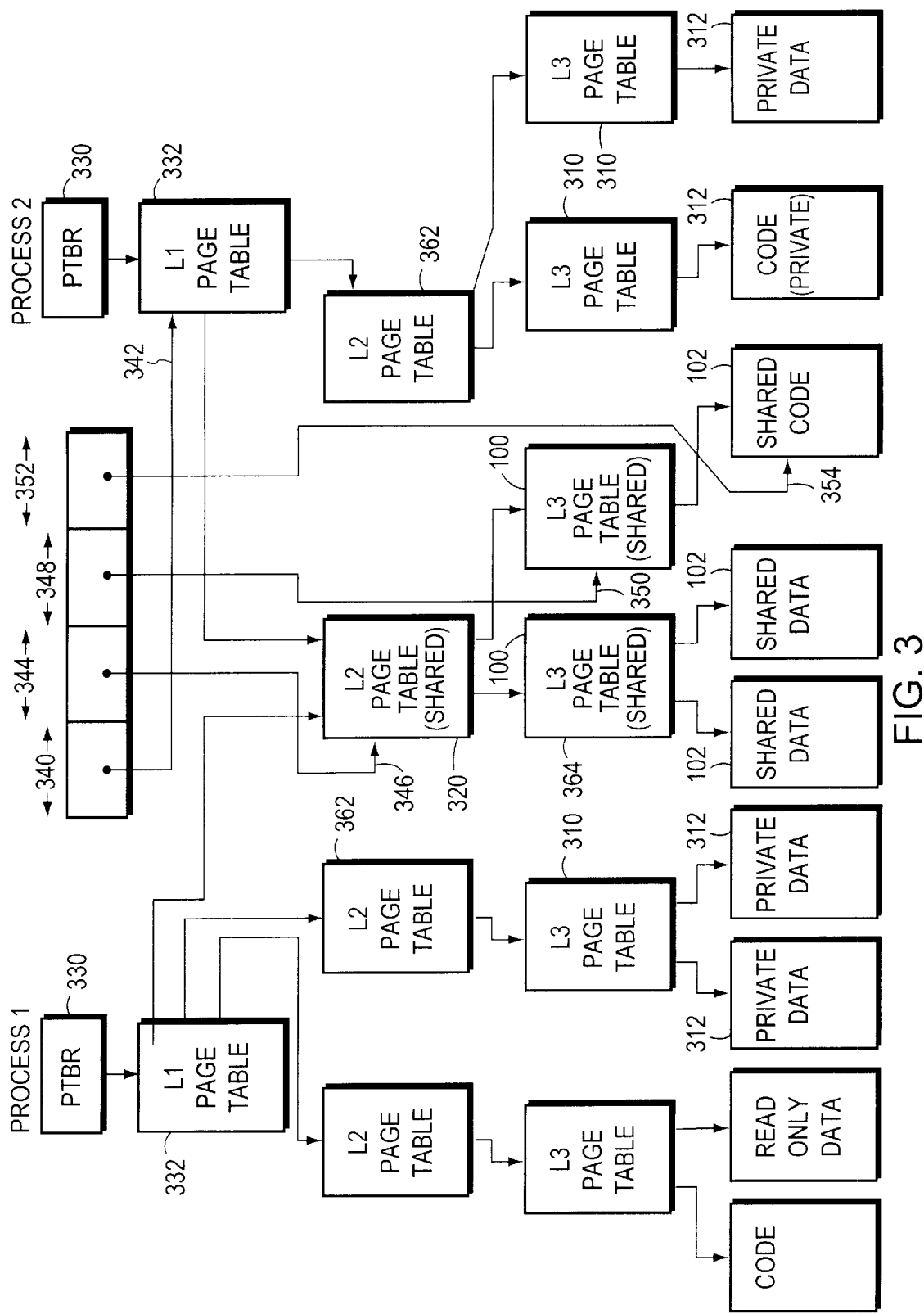
FIG. 3 is a block diagram showing 4-level address translation.

Referring to FIG. 3, in an alternative embodiment, shared page tables could be extended to pageable global sections. Shared pages 102 mapped by the shared page tables 100 would be paged using the same mechanisms used to page process private pages 312. In a further variation, shared page table pages could be paged, preferably using the same mechanisms used to page unshared page table pages 310. It would be preferable to keep the highest-level shared page table 320 unpaged and memory resident.

Each process will have a consistent view of the page tables. For instance, the global pages mapped by these page tables would reside in a common working set list that is shared among all sharers of the page table. The page tables themselves would be present in that same working set. The common working set for the pageable region will be distinct from the system working set, because the pages of the shared object would evict system pages from the system working set. The common working set would be a distinct entity that is subject to the same working set list dynamics as process working sets.

I.F SECURITY CONSIDERATIONS

An implementation might enforce several constraints, to enforce inter-process security; other embodiments might relax some of these constraints, or substitute others. A shared page table region can only map global sections that use shared page tables. An application can map more than one global section that uses shared page tables into a shared page table region. Attempts to map any other type of section into a shared page table region will fail. The starting virtual address for subsequent sections mapped into a shared page table region will always be rounded up to a page table page boundary. This will prevent two distinct sections from sharing the same page tables. Mappers can specify a non-shared page table region into which to map a section using shared page tables. However, such a mapping will not use shared page tables. Process private page tables will be created to map the section in question when a non-shared page table region is specified.

Finally, the shared page tables assigned to a global section are used exclusively by that section. Those page tables will never map pages belonging to another global section (even when there are unused PTE's within those shared page tables).

II DATA STRUCTURES

In an operating system using the invention, the modifications necessary to add support for shared page tables are small. Many portions of the memory manager require no modification at all.

Referring again to FIG. 3 in an example embodiment, the page table structure is a multi-level structure with 3 levels of page tables. Virtual address translation begins with the Page Table Base Register (PTBR) 330, which contains the physical page denoting the root 332 of a process's page table structure. Each virtual address consists of four major parts. The highest-order bits 340 of the address are used as an index 342 into the level 1 page table 332. The high-middle bits 344 are used as an index 346 into a level 2-page table 320, 362. The low-middle bits 348 are used as an index 350 into a level 3 page table 100, 310, 364. The lowest order bits 352 are used as an index to select a specific byte 354 in a code or data page 102. The four constituents of a virtual address are used to select the appropriate entries and bytes respectively, in the page table structure.

In a particular implementation of the invention, the page tables themselves, and the page frame database (the operating system's data structure that elaborates on the page tables, to assist in managing the pages) may require no modification. Other operating systems may require some modification in order to exploit the invention.

Shared page table global sections are used to represent shared page tables. As such, the same structures used to manage and share standard global sections are also used to manage and share shared page table global sections.

Referring to FIGS. 4 and 5, the management of a global section uses several basic data structures that are stored in system address space. For historical reasons, each global section is managed by two data structures: a Global Section Descriptor (GSD) 400, and an entry in the Global Section Table, a Global Section Table entry (GSTE) 500. For each global section, these two data structures, and their associated PTE's, have fields (either pointers or table index values) that maintain their association with each other.

In the invention, the data structures managing global sections were modified, to add fields (or overlay an existing field with a new field) that maintain an association between the data structures for managing the process leaf global section and the structures managing the related shared page table global section. For instance, to the GSD 400 is added a field, named RELATED_GSTX, an index into the GST 450, indicating the GSTE 500 for the shared page table global section. With the correspondence or link in place, the user can refer to the global section of interest and leave the management of the linked page table global section to the memory management executive.

Referring to FIG. 4, the Global Section Descriptor (GSD) 400 describes the global section. GSD 400 includes the name 402 of the global section that is the handle used to manage the section. The GSTX 403 field is an index into the Global Section Table and identifies the associated GSTE. Among other items, the GSD 400 contains security related information and flags 404. Three of the flags are relevant in the invention: a "shared page tables" flag SHARED_PTS 452, a "memory resident" flag MRES 454, and an "pre-allocate" flag ALLOC 456.

Referring to FIGS. 4 and 5, flags 452 and 552 are shadow copies of each other, with identical meaning. Flags 452, 552 are named SHARED_PTS, and indicate that the section holds shared page tables. The shared page table flag 452 distinguishes between the section for the leaf pages and the corresponding section for the page table pages. Both global sections have the same name 402; this bit 452 distinguishes the two.

The MRES flag 454, 554 indicates that the global section is memory-resident, that is, that once the page is allocated or faulted in, it is never faulted out until the process explicitly releases it.

The ALLOC flag 456, 556 when One, indicates that the allocation request was satisfied from reserved memory in a contiguous chunk; when Zero, the flag indicates that memory is to be faulted into existence as each page is touched.

Referring to FIG. 5, the second data structure describing a global section is a Global Section Table entry (GSTE) 500. Each GSTE contains, among other things, a pointer 502 to the corresponding GSD 400, a flags field 504 (whose contents are the same as the flags field 404 of the corresponding GSD), a reference counter 508 used for GSTE accounting purposes (the number of process Page Table Entries (PTE's) that map to pages within the global section), a count of the number of pages in the global section and information about the file that is used as the backing storage for the pages within the global section. The GSTE also contains an index 512 into the Global Page Table (GPT) of the first Global Page Table Entry (GPTE) corresponding to this global section. This index is referred to as the GPTX.

The Global Page Table is an array of entries. An entry within the GPT is called a Global Page Table Entry (GPTE).

Each GPTE describes the state of each global page in the section. The system routines that create global sections allocate one GPTE for each page in the newly-created global section. The Global Page Table Entries (GPTE's) are prototype PTE's used to store information about the individual pages that make up the global section. When a global section is created (not yet mapped), each GPTE is initialized to either a valid or an invalid form. That is, each invalid GPTE contains a pointer to its associated global section. (The invalid GPTE actually contains a GSTX, a GST index. This index is used to locate the corresponding GSTE. The GST is treated as an array of GSTE's.) Each valid GPTE contains a Page Frame Number (PFN) of the physical page assigned to the global section is stored in the GPTE. Otherwise, the GPTE is "invalid" and the backing storage address of the global section page is stored in the GPTE.

The GPTE's for memory-resident global sections contain the GSTX when the GPTE is invalid. The DZRO indicator is also set when the GPTE is invalid. Once a GPTE becomes valid, it cannot become invalid while the global section still exists. The PFN that is placed within the GPTE does not change. The physical page is assigned to the global page and remains in memory.

At the user interface level, the name 402 (generally a text string) of the global section is its handle. The operating system resolves this user-visible name to a particular Global Section Descriptor (GSD). Within the memory management executive, the address of the GSD becomes the handle to the global section.

The PFN database is a array of data structures, one data structure corresponding to each physical page tracking the contents of the physical page. PFN database entry contains a reference count, a pointer to the associated backing store, a pointer to the PTE, an I/O reference count, and page state flags.

Figure 6:
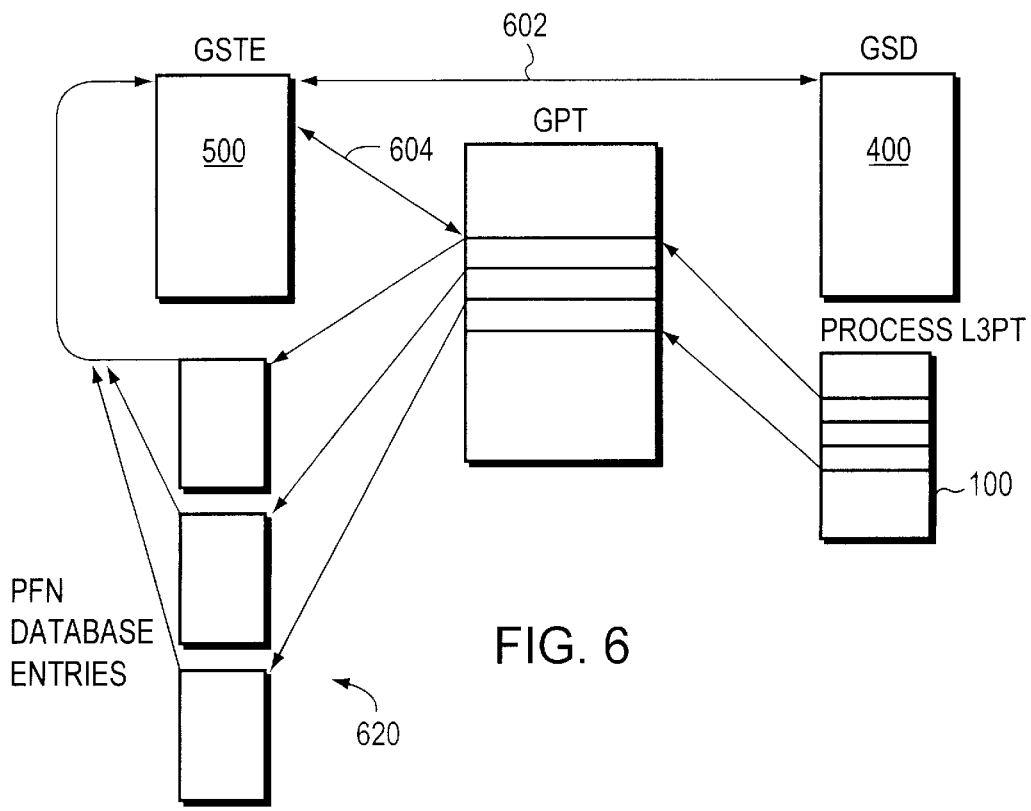

FIG. 6 illustrates the relationship between the global section data structures. When a global section is created, the operating system creates a GSD 400 for the global section, allocates a GSTE 500 for the global section, and allocates a contiguous array of GPTE's from the Global Page Table to describe the individual pages within the global section. Arrow 602 indicates the pointers that associate the GSD with the GSTE, and vice versa, using the GPTX 406 and the "address of associated GSD 502." Similarly, the GSTE and GPT have pointers back and forth to each other, as indicated by arrow 604. Invalid entries in the Level 3 page table 100 have pointers to the global page table, and the global page table in turn indicates where the backing store for the page is to be found.

Figure 7:
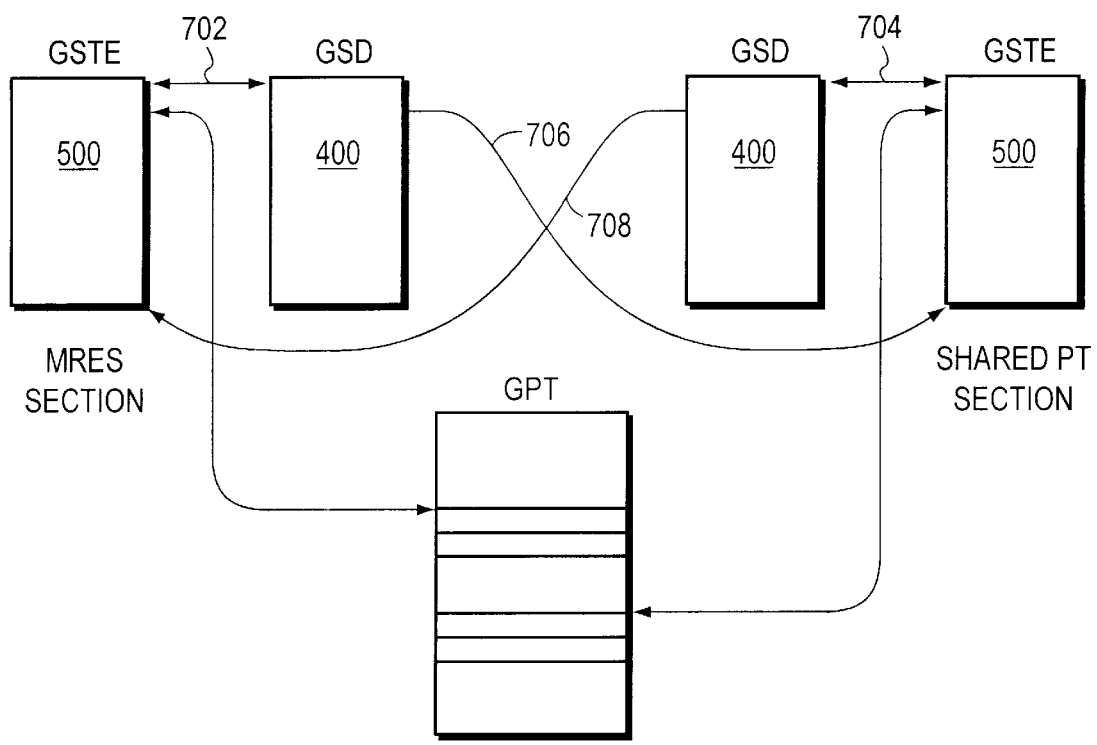

FIG. 7 illustrates the relationship between data structures for a leaf global section and its shared page table global section. The interrelationships among the data structures for the shared page table section parallel the interrelationships among the data structures for the leaf section. The GSD and GSTE for the leaf section point to each other (arrow 702), and the GSD and GSTE for the page table section point to each other (arrow 704). In addition, the GSD for the leaf section points to the GSTE (and indirectly to the GSD) for the shared page table section (arrow 706), and the GSD for the shared page table section points to the GSTE (and indirectly to the GSD) for the leaf section (arrow 708). Pointers in the two GSTE's point to respective blocks of entries in the GPT.

Various fields in the PTE and page frame database function as reference counts, lock counts, a count of working set list entries, and the like. The invention maintains the function of these fields.

The operating system has a utility routine that returns the number of PTE's per page table page. The value returned will vary with the size of the PTE and with the page size, and is the quotient of the system page size and the PTE size.

III OPERATION OF THE MEMORY MANAGEMENT SYSTEM

This section discusses the operation of a memory management system of the invention. Shared memory is created on a system when a process calls the create and map section system service routines. The routines accept as arguments the name of the global section, its size, virtual page protection, and a number of other arguments. After validating the arguments, the routines create the global section by creating, manipulating, and linking together the GSD 400, GSTE 500, and GPTE's. Once the data structures are initialized, the memory management executive maps the global section into the process's address space by initializing page tables for the section. If criteria are met, the section will be created with shared tables. Other processes, assuming they have the access rights, can also map the global section by specifying its name to a map global section system service routine; the shared page tables will be linked into the address-translation tree of the later-mapping process.

Section III.A discusses the creation of a shared virtual region with shared page tables. Section III.B discusses creating a global section with an accompanying shared page table global section. Section III.C discusses mapping to a global section that has an associated shared page table global section. Section III.D discusses faulting of leaf pages. Section III.E discusses faulting of shared page table pages. Section III.F discusses unmapping global sections. Section III.G discusses deleting global sections.

III.A CREATING A VIRTUAL REGION

Figure 8:
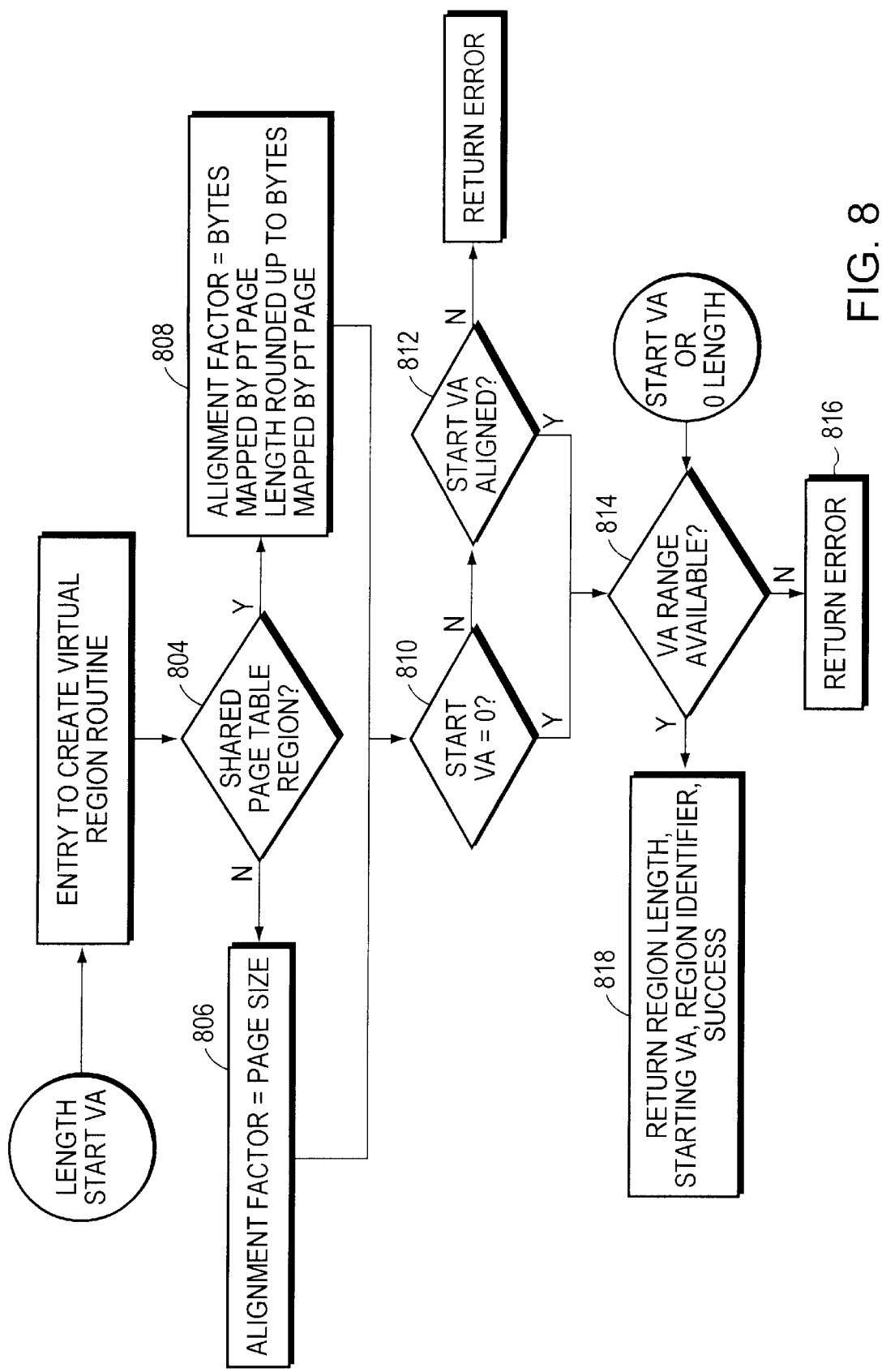
FIGS. 8–13 are flow charts showing sharing of page table pages and leaf pages.

Referring to FIG. 8, the create virtual region system service routine, SYS$CREATE_REGION, allows a user to reserve a block of virtual address space, and assign certain properties that will be inherited by objects mapped into the region in the future. No physical memory is committed to the region until a section is mapped to the region. Upon a successful return from this service, the user is given a handle to the newly created region. This handle or region identifier can then be passed to virtual address space creation system service routines.

Among other things, the create virtual region system service accepts a starting virtual address (start_va) argument and a length (in bytes) argument. The start_va argument is optional, and, when specified with a non-zero value, informs the service routine to reserve virtual address space at that specified start virtual address. If the start_va argument is not specified (or is specified as 0), the service locates the first available space within the virtual address space to accommodate the region creation request.

Steps 804, 806, 808, 810, and 812 enforce alignment constraints, when creating a standard virtual region (i.e. not a shared page table region), the start_va argument, if specified, must be page aligned and the length argument must be an even multiple of the system page size (step 806). When creating shared page table region, the start_va argument, if specified, must be page table page aligned. The length argument, at the minimum, must still be an even multiple of the system page size. For shared page table regions, the service will automatically round-up the size of the region to an even multiple of bytes mapped by a page table page (step 808). The alignment constraints are imposed largely to prohibit process private pages from being mapped by PTE's within shared page tables. The constraints keep page table pages from spanning two different virtual regions. This allows the operating system to restrict process private mappings in shared page table regions and shared page table mappings in other regions by checking the shared page tables attribute of the region before starting the mapping operation.

Reserving address space prevents other threads in the process from creating address space in the reserved area, unless they specify the handle of that reserved area to the address space creation routines.

Region creation involves the following steps:
1. After validating routine arguments (including whether length argument is an even multiple of the system's page size), the service determines if a standard region or a shared page table region is being created (step 804). (The service has a flags argument in which the user specifies whether a shared page table region is to be created.)
2. An alignment factor is computed based upon the type of region being created (page size for standard regions and multiple of bytes mapped by a page table page for shared page table regions) (steps 806, 808). If the size of the region would cause it to span multiple page table pages, an alignment factor is chosen such that the page table pages (once they are ultimately created) can be mapped with largest possible granularity hint factor. The alignment factor is used in the succeeding steps when the user specifies a non-zero start_va argument.
3. If a shared page table region is being created, the length argument is rounded up to an even multiple of bytes mapped by a page table page (step 808).
4. If the start_va argument is not specified, or is zero (step 810), an appropriately aligned virtual address will be selected. In either case, execution proceeds to step 6.
5. If the start_va argument is non-zero, it is checked for the proper alignment (step 812) using the alignment factor computed in step 2. If the start_va is not properly aligned, the service returns an error status. If the start_va is properly aligned, execution proceeds to step 6.
6. The length is rounded up to the next multiple of the alignment factor.
7. The process's address space is searched to verify that the virtual address range specified is available (step 814). (The search for available address space is governed by walking a list of data structures that track the virtual address usage for the process.) If the space is not available, the routine returns an error status (stp 816).
8. For a non-zero start_va, the virtual address range specified is reserved. For an unspecified or zero start_va, the first available space that can accommodate the length argument is located and reserved.
9. In addition to returning a successful status code, the routine also returns (in the output arguments), a region identifier, the actual number of bytes reserved, and the starting virtual address of the range (step 818).

III.B CREATING A GLOBAL SECTION

Figure 9:
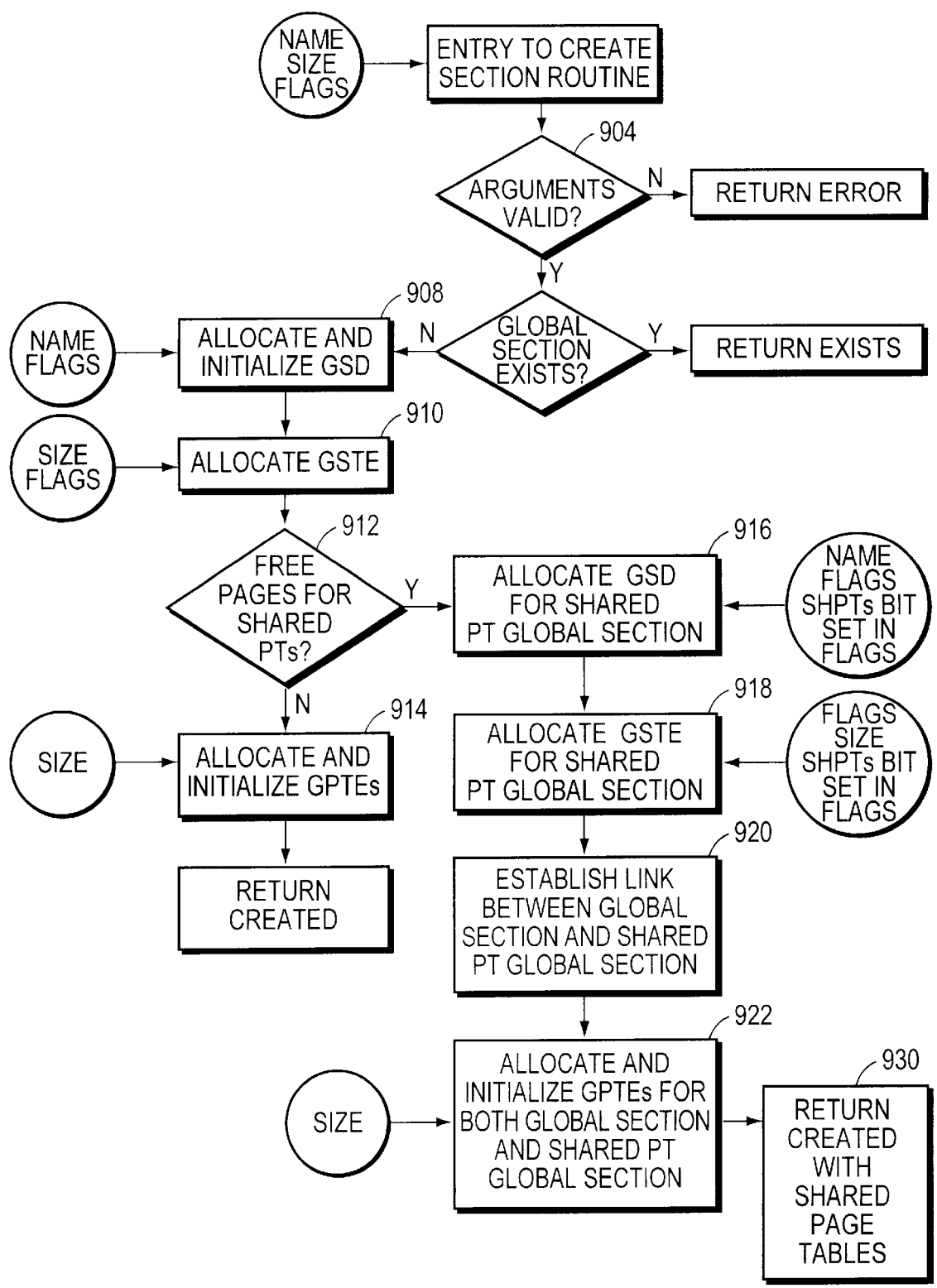

Referring to FIG. 9, to create a global section with shared page tables, the user calls a global section creation routine, for instance SYS$CREATE_GDZRO. Overall, the process of creating a global section involves creating several data structures, and materializing pages table page with initialized PTE's.
1. The routine arguments are validated (step 904).
2. The GSD for the leaf section is allocated (step 908) and partially initialized, with the name of the section (the name will become the handle) and the section creation flags.

3. A GSTE is allocated (step 910) and initialized to contain the address of the GSD, the number of pages in the section, and the section creation flags.
4. The reserved memory for the process leaf section is allocated.
5. The Reserved Memory Registry is examined for an entry associated with the global section name specified in the call. If there is a Reserved Memory Descriptor for both the leaf pages and for shared page table pages, or for neither, then a shared page table global section will be created. If there is a Reserved Memory Descriptor for only the leaf pages and not for the shared page table pages, then the section will use process private page tables (step 912).
6. If there are insufficient pages for the shared page tables, GPTE's are allocated and initialized for the global section only (step 914). The create section routine returns indicating that only the global section was created.
7. If this section will use shared page tables, the GPTE's for the shared page table section are allocated and initialized (step 922). If the memory for the shared page tables was not pre-allocated, pages will be allocated from the zeroed page list. Unlike process leaf data page GPTE's that can be created in the global invalid form (see step 13), shared page table GPTE's will always be created in the global valid form.
8. If the section will use shared page tables, a GSD and GSTE are allocated and initialized for the shared table section (steps 916, 918). The initializations parallel those for the global section, with the additional step, for shared page table sections, of setting the "shared page tables" bit in the flags field of the GSD and GSTE for the shared page table global section.
9. The link between the global section's data structures and the shared page table global section's data structures is established (the GSTE RELATED_GSTX fields are initialized as described in section I) (step 920).
10. The GPTE's for the process leaf section are allocated and initialized. The GPTE's are created as global valid or global invalid based upon whether the reserved memory was pre-allocated (step 922).
11. If the reserved memory for the process leaf section was pre-allocated, the corresponding PFN database entries are initialized.
12. The PFN database entries for the shared page table section are initialized.
13. The physical pages allocated for the shared page table global section are temporarily mapped so that their contents can be initialized to map the pages of the leaf global section.
14. If there was no Reserved Memory Registry entry for the global section, or if the Registry entry describes a global section with the FAULT option, the PTE's within the shared page tables are initialized to the global invalid form (these PTE's will be set to valid as each leaf page is faulted into place). If the Reserved Memory Registry specifies a batch of pre-allocated, zeroed pages, the PFNs are copied into the shared PTE's with the protection, ownership, and valid bits set. If the registry entry for the global section specifies the ALLOC option, the PTE's in the shared page tables are initialized as valid PTE's using the maximum granularity hint factor possible. If the size of the section is not an even multiple of pages mapped by a page table page, the unused PTE's will be zeroed.
15. The create section routine returns indicating that both the global section and its corresponding shared page table global section have been created (step 930).

Several of the above steps request physical pages. If there are no free pages available, the process is put in a wait state, and held until the physical pages are available to satisfy the request.

The bulk of the code of the memory manager is not affected by the addition of shared page tables. For instance, the code managing the PFN database is unmodified.

III.C MAPPING A GLOBAL SECTION

Figure 10:
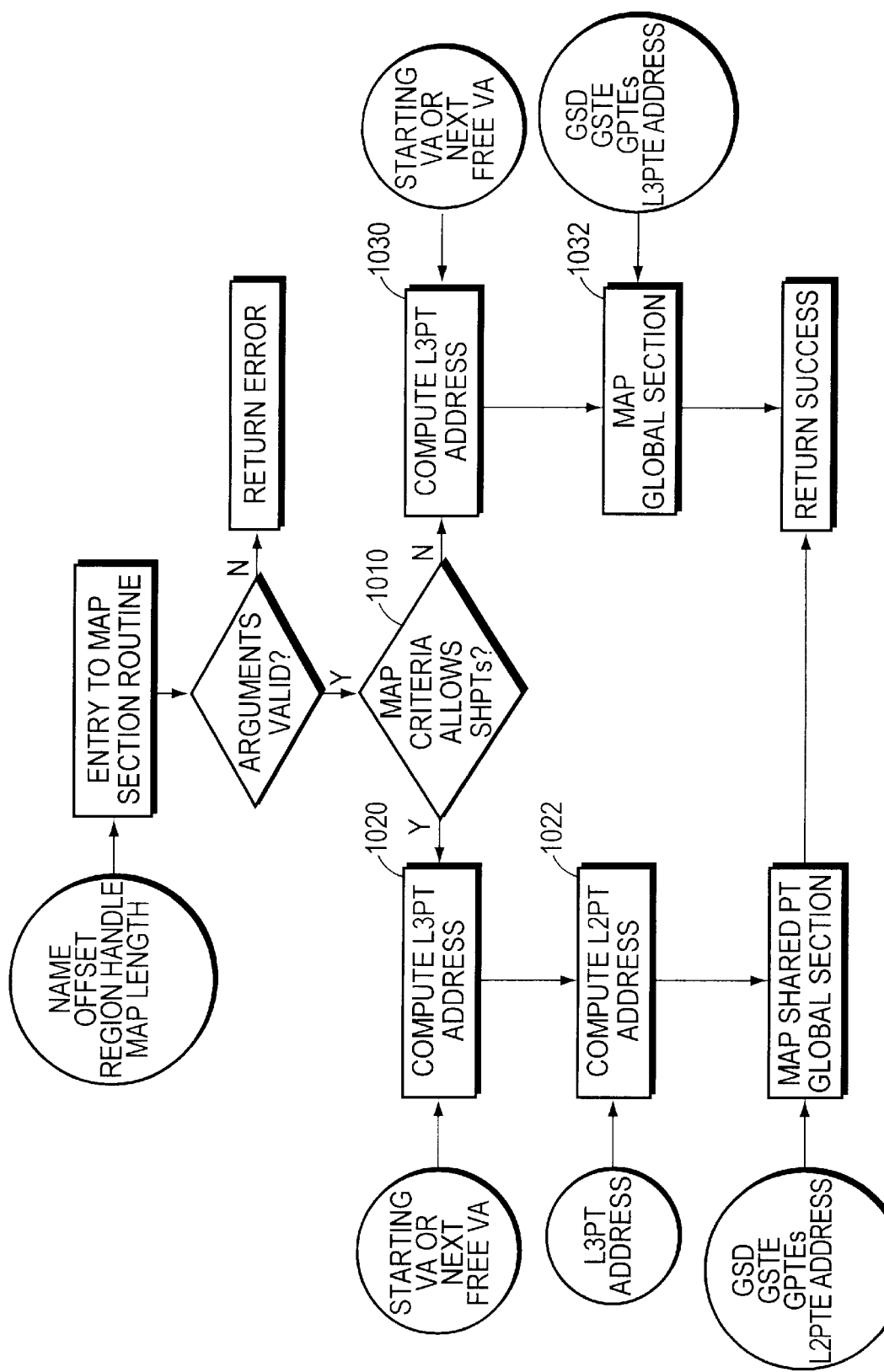

Referring to FIG. 10, Once a global section has been created, the next step is to map storage to the section through a call to a mapping system service. The process calls the mapping service with the handle of the global section to map, and (for some services) the file to map into the section. (The service SYS$CRMPSC combines the steps of creating and mapping a global section). The section can be mapped to demand-zero storage, a locked memory section, or a file. The system service routine determines whether the global section has a related shared page table global section. If a shared page table global section is found, and certain mapping criteria (discussed below) prevail, the virtual address space is materialized by using the shared page table global section.

III.C. 1 MAPPING ALIGNMENT CRITERIA

The operating system enforces certain criteria on the parameters passed to the mapping call. If these criteria are not met, the system service routine uses process private page tables to establish the mapping. These criteria enforce security, for instance by preventing process private data from being mapped through shared page table pages into other processes' address spaces.

If the caller does not specify the handle of a shared page table region, any mappings to global sections that have an associated shared page table global section only use process private page tables.

If a shared page table region is specified, the map length (number of bytes to map), must be an even multiple of bytes in a page. This ensures that the last byte mapped includes the last byte of the section mapped into the address space. If the length is not page table page aligned, then the section will be mapped with process private page tables. In any event, the length must be a multiple of the page length.

The caller has the option of either specifying a starting virtual address at which to map the global section, or allowing the system service routine select a virtual address at which to perform the mapping. If the user specifies both a shared page table region and a starting virtual address, the starting virtual address must be aligned to a page table page aligned value to permit mapping the section with shared page tables.

If the user has not specified a virtual address, the system service routine will select the next available virtual address in the shared page table region that is aligned to a page table page boundary.

The system service map routine has a global section offset argument to allow the caller to map only a portion of the entire global section. The global section offset argument specifies the first byte in the global section to map. When this argument is specified with a shared page table region, the global section offset argument must be an even multiple of bytes mapped by a page table page, because this example embodiment does not allow a process to map only a portion of a shared page table page into a process's address space. If the service routine is used to memory map a file, the map offset (offset relative to the start of the file) must be page aligned. If mapping shared memory whose backing store is the system page file, the map offset must be page aligned.

III.C.2 MAPPING PROCEDURE

If the mapping call meets the above constraints, and the region into which the section is mapped was created specifying shared page tables, then the section's mapping will use shared page tables. Note that a user has the flexibility declining to use shared page tables, by intentionally violating any one of the above mapping criteria.

The following steps highlight the specifics of mapping a shared page table global section.

1. The arguments specifying the offset into the global section, the number of bytes of the global section to map, and the starting address argument, if specified, are validated to determine if they adhere to the mapping criteria stated above (step 1010).
2. If the specified arguments allow for page table sharing, a starting address within the process's address space is located (either by looking for the next available address to use, or using the user-specified starting address). The virtual address of the L3PT (level 3 page table 100, 364 of FIG. 3) that maps the starting address is then computed (step 1020). This address is then used to calculate the address of the process L2PTE's (level 2 page table entries, the entries in the level 2 page tables, 320, 362 of FIG. 3) that must be written to materialize the shared page table global section and the global section in the process's address space (step 1022).
3. The process L2PTE's are then initialized using the data stored in the shared page table global sections GPTE's and GSTE.
4. If the specified arguments do not allow for page table sharing, a starting address within the process's address space is located (either by looking for the next available address to use, or using the user-specified starting address). The virtual address of the L3PTE that maps the starting address is then computed (step 1030). This L3PTE is used as the starting point to materialize the global section in the process's address space (step 1032).

During the above process, the memory manager uses its conventional reference count accounting. Just as reference counts are conventionally incremented and decremented during the mapping and unmapping of process leaf pages, the reference counts are incremented and decremented as shared page table pages are inserted and removed from the address translation tree.

An "overmap" condition exists when the mapping request designates a block of virtual addresses that is already mapped. If the mapping call specified the "no overmap" flag, the mapping routine returns an error status. Else, the mapping routine performs the unmapping functions (discussed below at section III.F) to release the current mapping, and then performs the mapping procedure discussed above.

If the map request will not overmap existing address space within a region, and the entire map request can be fulfilled, and the process leaf section was created with the ALLOC option, the address space will be created with the most aggressive granularity hint possible. The shared page tables, if possible, will also be mapped with granularity hints.

III.C.3 GRANULARITY HINTS

Granularity hints can only be used if both the process leaf section and the shared page table section were created with the ALLOC option. In this case, the shared page tables will contain PTE's with non-zero granularity hint bits. The shared page tables are only mapped with granularity hints if the region contains a properly aligned virtual address. In general, the ability to map shared page tables with granularity hints calls for more stringent alignment requirements.

The alignment requirements for mapping shared page tables with granularity hint will not be enforced if the map request will not fit within the region.

As part of determining an appropriately aligned virtual address, it's possible that the specified amount of space to map will not fit within the shared page table region. In this case, as much virtual address space as remains within the region will be used. Note that the size of a region mapped by a shared page table is always an even multiple of bytes mapped by a single page table page. Therefore, even if the entire map request does not fit within a given shared page table region, an application is always guaranteed to map an integral number of pages mapped by a shared page table page.

III.D PAGE FAULTS FOR LEAF PAGES

A process that maps a global section typically has its process L3PTE's initialized in the global invalid form. That is, the L3PTE maps a page in a global section, but the page has not yet been faulted into memory. The page fault handler, will make the process's virtual page and the global page, valid once the page is accessed.

When a global section is mapped, the process has its L3PTE's initialized to point to the GPTE's of the section. (The L3PTE's actually contain a GPTX, a GPT index. This index is used to locate the corresponding GPTE. GPT is treated as an array of GPTE's.) A global page fault occurs when the process accesses a virtual page whose L3PTE is invalid and contains a GPTX.

III.D.1 GLOBAL INVALID FAULTS

Figure 11:
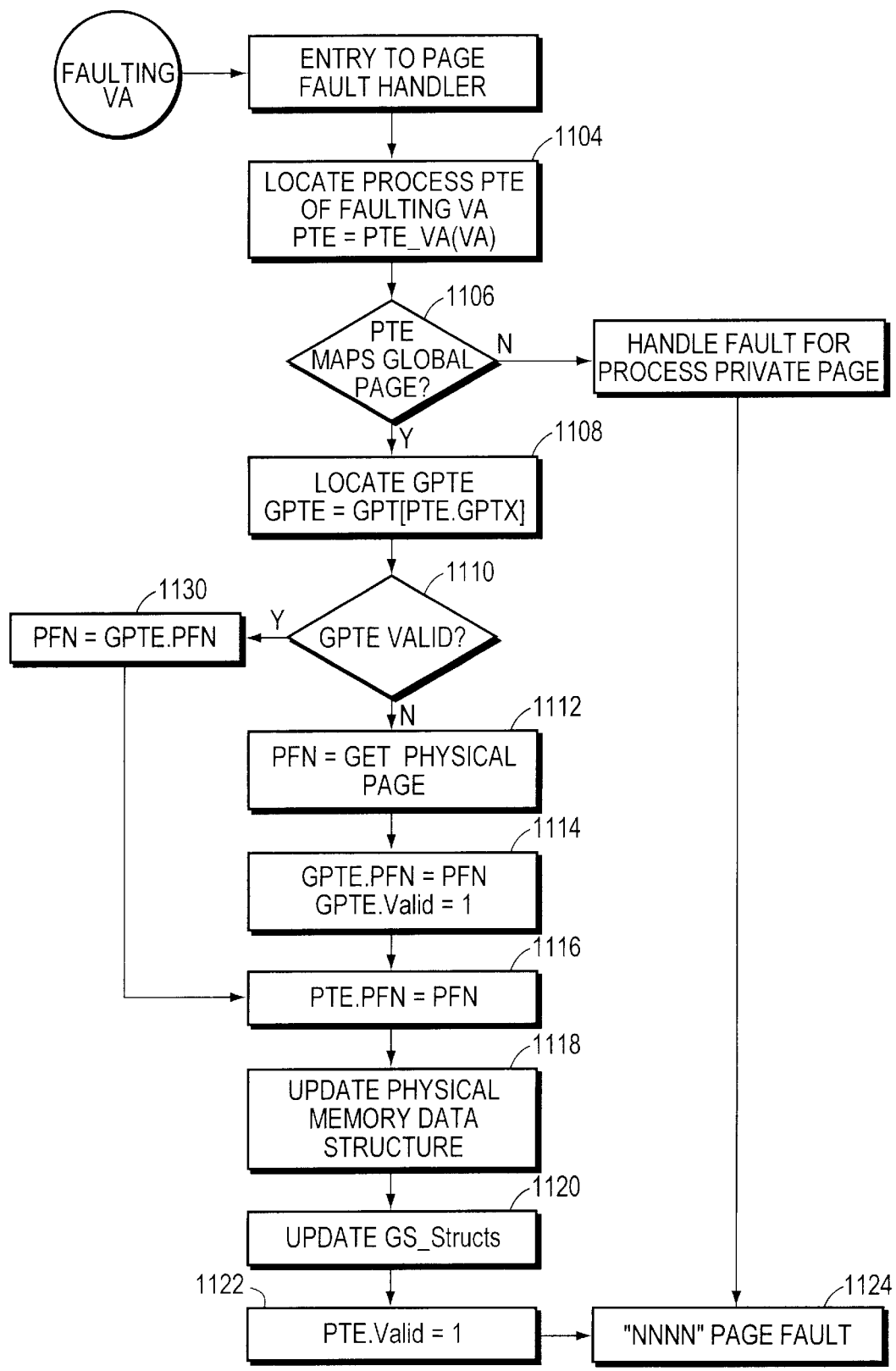

FIG. 11 shows page fault handling in the case where both the process L3PTE and GPTE it references are in the global invalid form.

1. The page fault handler determines that a page fault for a global page occurred by examining the process L3PTE that maps the virtual page just referenced.
2. The page fault handler traverses the virtual address path of the virtual page referenced. Starting at the top of the page table hierarchy, the handler confirms the validity of each page table page in the virtual address translation path for the page just accessed. Assuming that the L1PT, the L2PT, and the L3PT are all valid, the L3PTE mapping the virtual address accessed is examined (step 1104).
3. The handler determines that the L3PTE maps a global page (step 1106).
4. The handler extracts the GPTX from the L3PTE and locates the GPTE and global page mapped by the L3PTE (step 1108).
5. The handler determines that the GPTE referenced is also in the global invalid form, indicating that a physical page has not yet been allocated for this global page (step 1110).
6. The handler allocates a physical page (step 1112) and places its PFN (page frame number) in the GPTE and in the process L3PTE (step 1114).
7. The data structure that describes the state of all physical pages in the system is updated to reflect that a page has been allocated to a global section (step 1116).
8. Accounting related tasks are performed for the global section's GSTE to indicate that another process page is mapping a global page in this global section (step 1120).
9. The GPTE and process L3PTE are then changed to a valid form (step 1122). Making the GPTE valid is an indication that the GPTE now contains an actual PFN or physical page and not a GSTX. Making the process L3PTE valid allows for successful virtual to physical address translation.
10. Finally, the handler dismisses the page fault and the process is allowed to resume execution at the instruction that originally incurred the fault (step 1124).

III.D.2 GLOBAL VALID FAULTS

A global valid fault occurs when a process L3PTE (in the global invalid form) references a GPTE that is in the global valid form. A GPTE will be in the global valid form when another process has referenced that global page and caused it to transition from invalid to valid.

The steps in handling a global valid fault are very similar to handling global invalid faults. The difference is that the handler locates the GPTE and discovers that it's valid. At this point, the handler does the following:

- Copies the PFN from the GPTE to the process L3PTE (steps 1130, 1116).
- Updates the physical memory data base for that page (to indicate one more process reference) (step 1118).
- Updates the GSTE for the global section to indicate that another process page is mapping a global page in this global section (step 1120).
- Finally, the handler dismisses the page fault and the process is allowed to resume execution at the instruction that originally incurred the fault (step 1124).

III.E PAGE FAULTS FOR SHARED PAGE TABLE PAGES

Page faults for shared page table pages are treated in exactly the same manner as a global valid fault. The difference is that the faulting virtual address will not be that of a process data page, but rather the address of the L3PTE that maps the process data page. The computation to locate the process PTE will actually result in obtaining a process L2PTE address. Upon examining the L2PTE, the handler will detect that it is in the global invalid form. Therefore the only difference in the page fault flow of events, is that the faulting VA is the address of the process L3PTE, not a process virtual data page. The rest of the page fault algorithm executes in the same manner as it would if a page fault for a process data page is to be serviced.

III.F UNMAPPING GLOBAL SECTIONS.

III.F.1 DELETION OF LEAF PAGES

Figure 12:
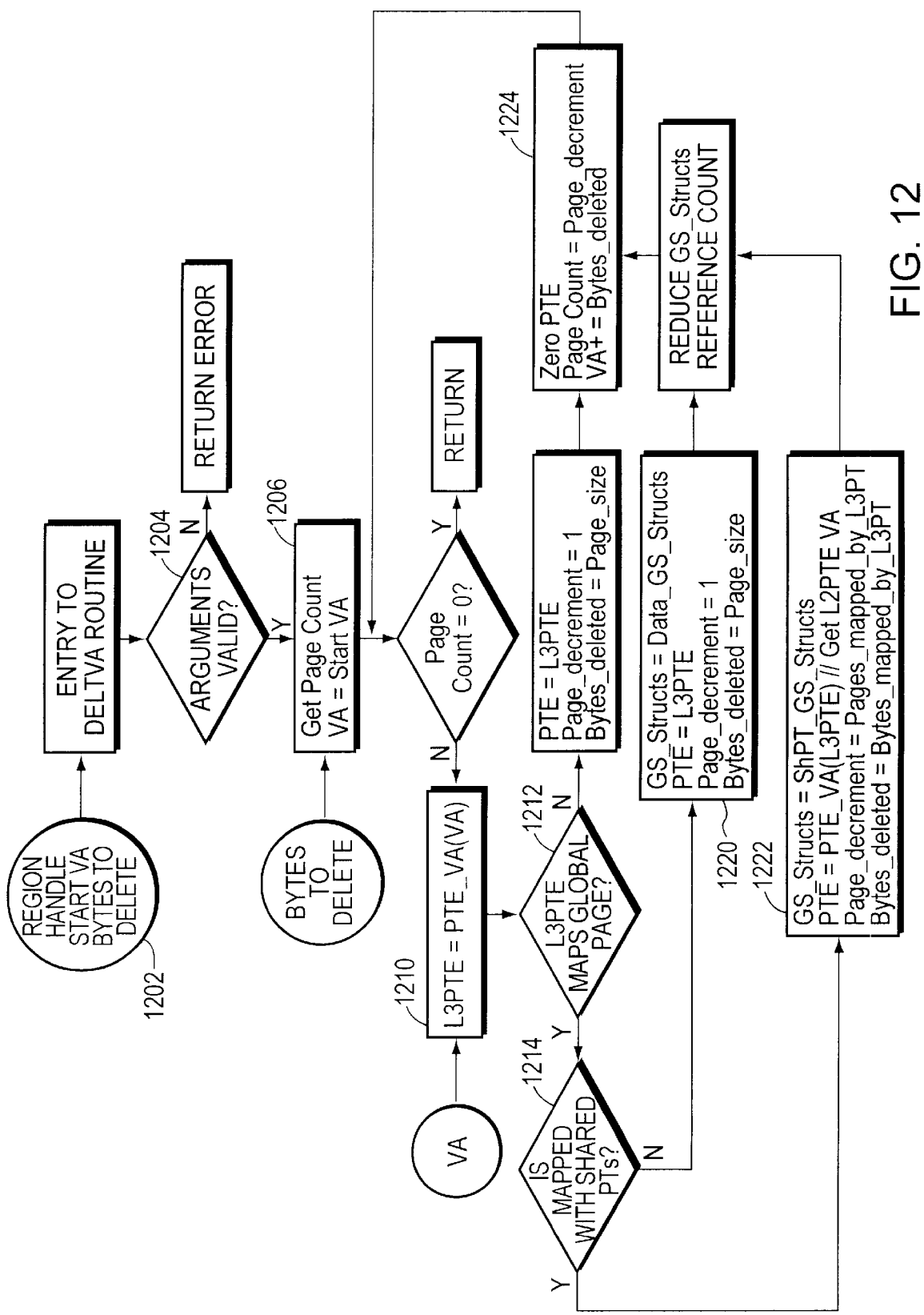

Referring to FIG. 12, unmapping a shared page table global section from a process address space is similar to unmapping a standard data global section, or unmapping or deleting regular virtual addresses. The DELETE virtual address system service (DELTVA) accepts arguments specifying a region identifier of the region from which the address space should be deleted, a virtual address from which to begin deletion, and the number of bytes to delete (step 1202).

The system service routine then executes these steps to unmap the global section, to delete the virtual address from the process.

1. The routine arguments are validated (step 1204).
2. The deletion process blocks if any I/O pending. A secondary check for memory-resident pages is to check the PFN reference count of the corresponding physical pages. A virtual address range mapped by shared page tables will only utilize the preliminary check since checking the memory-resident data page reference counts does not uniquely identify the current process as the process that actually established I/O to that physical page.
3. The number of virtual pages to be deleted is computed (step 1206).
4. For each page, the page type (global page versus process private page) is ascertained in order for the proper accounting to occur (step 1206). Page type information is gleaned from reading the L3PTE for each page in the range to be deleted. (Page deletion is driven by scanning each L3PTE in the range to be deleted.) The result is that virtual address space is deleted one page at a time.

The PTE address is computed by applying the PTE__VA function. This function accepts a virtual address and returns the PTE that maps that specified address. The following highlights the return values from PTE__VA when VA is process data or code page, a L3PTE address, and L2PTE address, and L1PTE address.

PTE__VA (VA) returns L3PTE address.
   PTE__VA (L3PTE) returns L2PTE address.
   PTE__VA (L2PTE) returns L1PTE address.
   PTE__VA (L1PTE) returns L1PTE address.

5. If the page type is global page (step 1212), a subsequent check is made to determine whether the global page is mapped by shared page tables.
6. If the page is not mapped by shared page tables, the data structures for the global section are obtained and manipulated to indicate one less reference to that global section (step 1220). (Note that the PTE scan uses the process L3PTE's.) The L3PTE is then zeroed to actually delete the virtual page.
7. If the page is mapped by shared page tables, the data structures for the shared page table global section are obtained and manipulated to indicate one less reference to that global section. The associated data global section's data structures are also manipulated to indicate that the number of global pages mapped by the shared page table global section are no longer referenced by this process. Since shared page tables are being removed from the address space, the PTE scan uses process L2PTE's instead of process L3PTE's (step 1222). The L2PTE is then zeroed to remove the shared page table and the pages it maps from the address space (step 1226). For a system with an 8 KB page size, zeroing a L2PTE has the effect of deleting up to 8 MB from the address space.
8. The reference counts for the shared page table and leaf global sections are decremented in one step after the address space has been deleted (step 1224).
9. In addition, if the L2PTE's have a non-zero value in the granularity hint field, all L2PTE's included in the granularity hint region must have their granularity hint bits cleared, and the corresponding L3PT virtual addresses are invalidated from the TB.

Virtual pages are deleted through explicit calls to operating system services, or implicitly when a mapping call attempts to overmap an existing mapping. Pages that are mapped by shared page tables and are to be deleted are handled differently from pages mapped by private page tables. The only way to remove a page mapped by a shared page table from a process's virtual address space is to remove the shared page table page from the process's address space. Consequently, if the deleted pages are mapped by shared page tables, the start address must be page table page aligned, and the length must be page table page aligned, or to the end of the section.

When a mapping routine detects an attempt to map a region of address space that is already mapped, the mapping routine calls the deletion routine to clear the previous mapping away. In a shared page table case, the effect is to remove the reference to a level 3 page table from a level 2 PTE.

III.G DELETION OF GLOBAL SECTIONS

Figure 13:
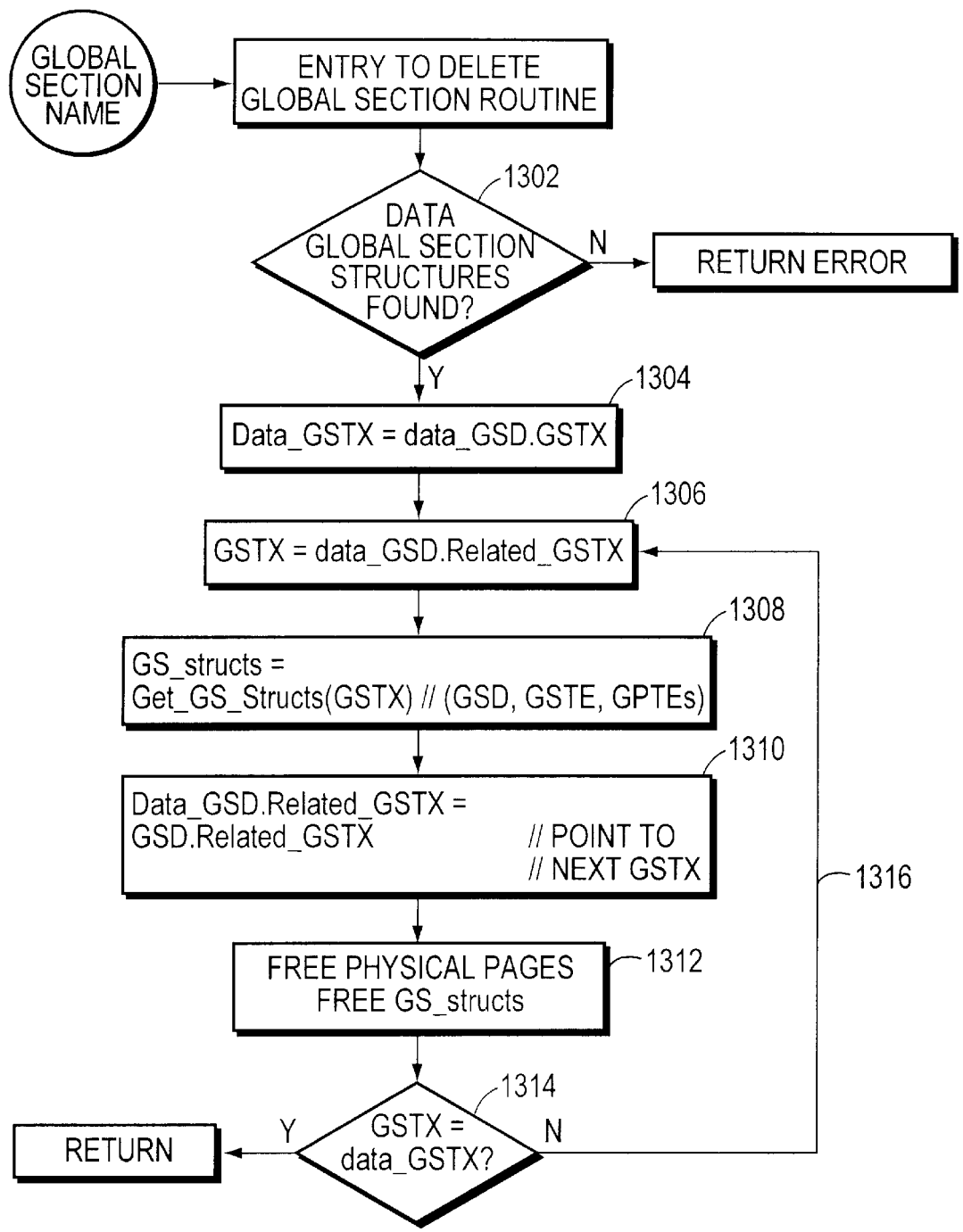

Referring to FIG. 13, global sections are deleted when there are no references to the pages in that global section.

1. The global section deletion routine locates the global section data structures for the global section to be deleted. Global sections are identified by a text string (step 1302).
2. The RELATED_GSTX field of the GSD of the data global section is examined to determine if a shared page table global section is associated with this global section. This GSTX is saved in Data_GSTX as a means of terminating the loop that deletes a series of related global sections (step 1304).
3. The RELATED_GSTX will contain either the GSTX of the data global section if there is no associated shared page table global section, or the GSTX of the shared page table global section. In any regard, the contents of the RELATED_GSTX field is extracted and the global section data structures associated with that GSTX are obtained (step 1308).
4. The data global section's GSD.RELATED_GSTX field is updated with the contents of the GSD.RELATED_GSTX field of the GSD (step 1310).
5. The shared page table pages will be returned to the Reserved Memory pool if they originated from there, or to the free page list.
6. The global section data structures (GSD, GSTE, and GPTE's) are deallocated (step 1312).
7. If the GSTX of the structures just deleted is the same as the GSTX saved in Data_GSTX, the global section was successfully deleted (step 1314). The implication is that this global section had no related shared page table global sections. The routine then returns.
8. If GSTX is not equal to Data_GSTX, a shared page table global section was just deleted, and execution branches (arrow 1316) back to step 3 so that all of the related global sections can be deleted.

III.H SHARED PAGE TABLES FOR PAGEABLE GLOBAL SECTIONS

Extending shared page tables to pageable global sections would require each process to have a consistent view of the page tables. There can be no process copy of the page table. In addition, the global pages mapped by these page tables must reside in a working set list that is available to all sharers of the page table. The page tables themselves will be managed as part of that same working set. All sharers of pageable global sections mapped by shared page tables have access to a common working set list. The notion of a common working set list is similar to the system working set list which tracks the residency of pageable system pages. That is, if one process faults a system page into the system working set, that page becomes valid for all processes on the system. The same will be true of the common working set.

An actual implementation of a common working set will not use the system working set for shared page table pages and the global pages they map. One reason is that the system working set is not subject to trimming. Pages are added to the system working set until it is full. Once the system working set is full, replacement paging is necessary. Placing large numbers of global pages mapped by shared page tables into the system working set can cause system pages to be ejected from the working set. If the corresponding global section is extremely large, a high rate of system paging can occur, which can, in turn, adversely affect system performance.

As a result, the common working set would be a distinct entity that is subject to the same working set list dynamics as process working sets.

IV THE RESERVED MEMORY REGISTRY
IV.A OVERVIEW
IV.A.1 The Reserved Memory Registry The Reserved Memory Registry reserves memory out of the fluid page pool managed by the virtual memory manager, and allows users to allocate physical memory to unprivileged processes. For instance, this allows user programs to have access to locked, unpaged memory, and large contiguous chunks of memory that can exploit the "granularity hints" feature.

The Reserved Memory Registry includes the following components. A Reserved Memory Registry (RMR) data file stores information about what memory is to be reserved. The SYSMAN (system manager) utility provides a convenient interface to edit the RMR data file. AUTOGEN is a software component that tunes parameters of the operating system, for example, to retune the virtual memory control parameters to improve paging performance. A component of the system startup creates a linked list of Reserved Memory Descriptors (RMD) and sets aside the reserved memory so that it is not used by the operating system for other purposes. Each RMD structure describes a piece of reserved memory. The RMD list is used by the operating system to manage the reserved memory in the running system. The system idle loop is enhanced to zero reserved pages. The operating system provides services by which application programs allocate and deallocate memory from the reserved pool.

The Reserved Memory registry divides physical memory into a number of pools. Each pool created by the Registry has a name, and application programs can allocate memory from a given pool by specifying its name. Memory not allocated to one of the Reserved Memory pools is left in the residual system fluid page pool. Each Reserved memory pool has one of two allocation disciplines—ALLOC or FAULT. A process obtains contiguous blocks of non-paged memory from an ALLOC pool; the storage is checked out of the pool immediately when the allocation service is called. ALLOC storage is tailored for use with the "granularity hints" feature. From a FAULT pool, a process obtains "allocate on use" storage, storage that is not allocated until touched by the process. When the process is finished, it can return the storage back to the pool.

IV.A.2 Advantages of the Reserved Memory Registry

If contiguous pages were pre-allocated for a locked shared memory object, a VLM application that uses the shared memory object can realize a performance increase for the initialization of the shared memory object. Initialization includes the creation of the shared memory object, all processes mapping to the shared memory object and each process starting to access the memory.

1. The creation time for the shared memory object is improved due to the simple mechanism used to allocate the physical pages. One call is made to the Reserved Memory Registry to obtain the entire set of pages. These pages have also already been zeroed during system idle time as well so that creation is not slowed down waiting for the pages to be zeroed.
2. The mapping time for the shared memory object is improved because the page table entries that map to the shared pages are marked valid at this time. The mapping algorithm simply sets up a prototype PTE with the lowest PFN, the valid bit set and the appropriate protection bits set. To map the next PTE, PFN in the prototype PTE and the PTE address are simply incremented and the PTE written.
   2.a If shared page tables were created for the shared memory object, an order of magnitude fewer PTE's are written to map to the shared memory object. This decreases mapping time as well.

2.b Mapping time is further decreased because only one system resource lock is acquired and released during the mapping algorithm to add reference information to shared memory object data structures. Thus, there is minimal contention for this system resource lock if many processes are mapping to the same shared memory object simultaneously. No system resource lock acquire/release is required because the reference accounting can be performed with interlocked instruction sequences.

3. The access time to touch the pages mapped to the locked shared memory object decreases because the PTE's were set to the valid state when they were mapped into the processes address space. No time is spent handling page faults as each process initially accesses each page. Page fault handling also acquires and releases a system resource lock. Therefore, not incurring these faults reduces the contention for this lock, thus improving application performance.

The system manager also has the flexibility to specify that a pool of reserved memory be used collectively by applications that require locked memory. This allows the system manager to have finer control over the system's memory usage based on the expected use of the VLM applications.

The use of locked memory is guaranteed to not cause the system to become starved for free pages. Therefore, VLM applications that use locked memory do not require system privileges.

The Reserved Memory Registry allows applications to take advantage of the huge page feature by supporting reserved memory that is allocated in contiguous chunks during system initialization.

Pre-allocated contiguous memory can be zeroed during system idle time so that unprivileged applications do not have to wait for memory to be zeroed.

Memory freed from the Reserved Memory Registry becomes available to the system without a system reboot. The system can benefit from the freed memory by allowing additional pages to be locked by other applications. Also, if the pages were pre-allocated at system initialization, the freed pages are deallocated onto the system's free page list.

The following sections describe the design of the Reserved Memory Registry.

IV.B FUNCTIONAL DESCRIPTION

IV.B.1 The Registry data file

The systems administrator tells the computer about desired memory reservations by making entries in a data file. A utility, SYSMAN, is provided, to edit the file. The file is read during system initialization (boot time), to establish the memory reservations.

Figure 14:
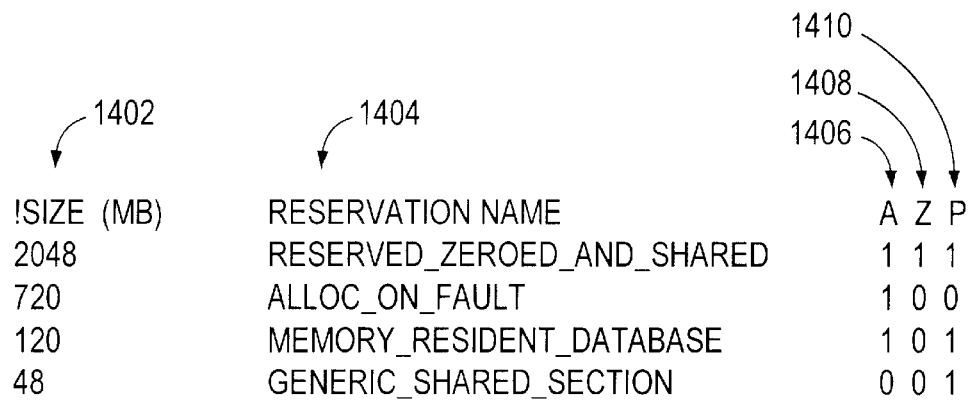
FIG. 14 is an example of a Reserved Memory Registry data file.

Referring to FIG. 14, the size 1402 of the memory reservation is specified in megabytes. The name 1404 of the Reserved Memory data file entry is specified as an ASCII string. The ALLOC flag 1406 indicates that the Reserved Memory is to be preallocated as one contiguous chunk of physical memory at system initialization time. The ZERO flag 1408 indicates that the memory is to be zeroed during system idle time. This flag can be set only if the ALLOC flag is set for the same entry. The PAGE_TABLE flag 1410 indicates that shared page tables are to be reserved and used to map the reserved memory.

IV.B.2 The SYSMAN utility

The SYSMAN utility supports the RESERVED_MEMORY command for manipulating entries in the Reserved Memory Registry.

The SYSMAN command to add an entry to the data file is as follows:

SYSMAN RESERVED_MEMORY ADD gs_name
　/SIZE={size of reserved memory, unit: MB}
　/[NO]ALLOCATE
　/[NO]ZERO
　/[NO]PAGE_TABLES The gs_name field is the name of the memory-resident global section associated with this reserved memory. A name must be specified. If the /ALLOCATE qualifier is specified, contiguous, aligned pages are allocated during the next reboot of the system. If the /NOALLOC qualifier is specified, or left to default, the physical pages will be allocated only as they are touched by a process. The /ZERO qualifier specifies that the storage is to be zeroed during system initialization; the /NOZERO (or default) qualifier specifies that storage is zeroed when the page is faulted into existence, immediately before being tendered to a user process. The /ZERO qualifier is only allowed if the /ALLOCATE qualifier is specified.

If the /PAGE_TABLES qualifier is not specified or if /NOPAGE_TABLES is specified, additional memory is not reserved for shared page tables. When the memory-resident global section is created, shared page tables are not created for the global section.

If the /PAGE_TABLES qualifier is specified, additional memory is reserved for shared page tables. When the memory-resident global section is created, shared page tables are created for the global section. If the /ALLOCATE qualifier is not specified or if /NOALLOCATE is specified, the additional reserved memory is only deducted from the system's fluid page count. If the /ALLOCATE qualifier is specified, additional contiguous, aligned pages are allocated during the next reboot of the system for the shared page tables and the additional reserved memory is deducted from the system's fluid page count.

The SYSMAN RESERVE MEMORY ADD command operates as follows. First, the arguments are validated for consistency: for instance, if /ZERO is specified, it is an error to specify /NOALLOC. The existing RMR data file is opened, or a new one created. If an entry already exists with the specified name, an error is reported and the command terminates. Else, a new entry is added to the file, with the specified size, name, ALLOC, ZERO, and PAGE_TABLES flags. The entry is added to the file such that the entries are kept in descending size order. This allows for contiguous pages to be allocated in an optimal way during system initialization.

The SYSMAN command also has a MODIFY subcommand, that allows for changing entries in the RMR data file. The data file may be sorted to maintain the entries in size order.

The SYSMAN command has a REMOVE subcommand to delete lines from the RMR data file.

The SYSMAN ADD, MODIFY, and REMOVE commands only edit Reserved Memory Registry data file; they do not affect memory reservations in the running system.

IV.C DATA STRUCTURES

Reserved Memory Descriptors (RMD's) are used to describe Reserved Memory in the running system. The RMD's are organized in a linked list managed by the operating system in the non-paged pool. The list is built during system initialization, when the RMR data file is read and translated from ASCII form to an internal data structure form. The entries in the list are kept in descending size order, to facilitate optimal page frame allocation, and reduce fragmentation.

Figure 15:
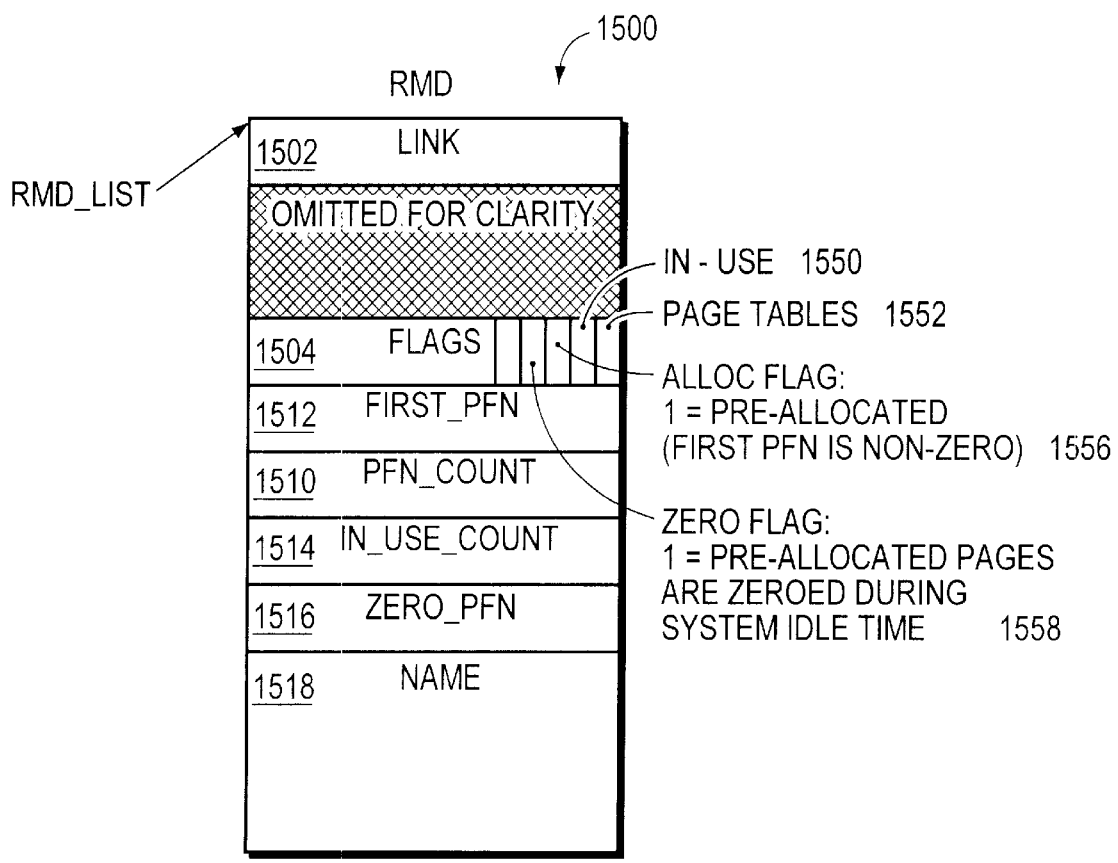
FIG. 15 is a diagram showing a data structure for memory reservations.

Referring to FIG. 15, each RMD 1500 has the following member fields. LINK 1502 is the linked list pointer to the next RMD's in the registry. FLAGS 1504 is a collection of bits. A first flag 1550 is IN_USE—the memory of this section is presently allocated and in use by an application. A second flag is the ZERO flag 1558—if the ALLOC and ZERO flags are set, pre-allocated pages are zeroed during system idle time. A third flag 1556 indicates the ALLOC flag—pages for this object are allocated in a contiguous group at boot time. A fourth flag 1560 indicates ZERO_DONE—if ZERO flag is set, page zeroing is finished for this group. PFN_COUNT 1510 is the count of the number of physical pages in the section, equal to the quotient of the size of the memory resident section and the number of bytes in a page. If the ALLOC flag is set, FIRST_PFN 1512 is the first physical page of the contiguous allocation block. A fifth flag 1552 indicates that the RMD is for a shared page table section. The IN_USE_COUNT 1514 is a count of the number of pages in use by applications. If the ZERO flag is set and the IN-USE and ZERO_DONE flags are clear, ZERO_PFN 1516 is the next page to zero during the system idle loop. NAME 1518 is the name associated with this Reserved Memory block Entries in the RMR data file that call for shared page tables create two RMD's 1500—one for the leaf section, and one for the shared page table section. The RMD describing a page table section is of the same form, and has the same name, as the memory resident section's RMD, with three exceptions. The PAGE_TABLES flag is set in the FLAGS field 1504. The ZERO flag 1508 is always clear regardless of whether this bit is set in the memory resident section's RMD. This bit is only set for the page table RMD if the ALLOC bit 1506 is also set. PFN_COUNT 1510 is the count of the number of physical pages in the section, equal to the quotient of the size of the leaf memory resident section and the number of bytes mapped by a page table page (rounded up as necessary).

IV.D OPERATION

Memory is allocated and deallocated from the Reserved Memory pool using a set of system routines. For an application to create a memory-resident global section out of Reserved Memory, the global section name must exactly match the name of the Reserved Memory Registry entry.

If the global object creation call specifies a name that does not match an entry in the Reserved Memory registry, then the call will attempt to allocate pages from the system's fluid page pool. If this succeeds, the system service routine creates the memory-resident global section with the FAULT option.

After the system service routine has obtained the Reserved Memory for the memory-resident global section, it may call a Reserved Memory Registry routine to allocate the associated shared page table global section. If page tables were not specified for the entry, this indicates to the system service routine to not create a shared page table global section.

A side benefit of using the ALLOC option for the shared page table global section is that the page tables can be mapped into page table space using granularity hint regions.

IV.D.1 The AUTOGEN utility

AUTOGEN is a software component that examines the system to determine what physical resources are present, and examines the RMR data file and other configuration parameters to determine what resources are dedicated to specific purposes. AUTOGEN then determines certain tuning parameters that will be used during system execution. AUTOGEN stores these values where the operating system can find them during system initialization. The operating system then manages the system according to the determinations made by AUTOGEN. Typically, the system administrator runs AUTOGEN after running SYSMAN to update the RMR data file, and before the next reboot.

Among the data computed by AUTOGEN are FLUID_PAGES, MIN_FLUID_PAGES, and SLOT_COUNT, WORKING_SET_MAX and other parameters.

FLUID_PAGES is the number of fluid pages in the system, the number of pages that can be reclaimed from processes or the system through swapping and other paging activities. MIN_FLUID_PAGES is the number of pages that may not be locked in order to keep the system from performing poorly. MIN_FLUID_PAGES is based on the number of processes the system can keep in memory. SLOT_COUNT is the maximum number of processes that may be maintained by the virtual memory manager without resorting to swapping. WORKING_SET_MAX is the maximum number of pages a process may currently hold in its working set. AUTOGEN computes these according to the following steps:

1. Determine PHYS_PAGE_COUNT, the total number of physical pages in the system.
2. Read the Reserved Memory Registry data file, and compute the amount of memory registered in all Reserved Memory Registry entries and convert to pages, RESERVED_PAGES.
3. Subtract RESERVED_PAGES from PHYS_PAGE_COUNT and do some error checking to make sure there is still a minimal amount of memory for the operating system.
4. Based on the new PHYS_PAGE_COUNT and other parameters, calculate SLOT_COUNT and WORKING_SET_MAX as well as other parameters.
5. Write new parameters to the system parameters data file.

IV.D.2 SYSTEM INITIALIZATION

System initialization uses the system parameter data file and the RMR data file to build a linked list of Reserved Memory Descriptors 1500, and to reserve memory out of the system fluid page pool.

To ensure that the contiguous pages can be allocated and that runtime physical memory allocation routines can be used, memory reservations are made soon after the operating system's physical memory data structures have been initialized, but before physical memory can become fragmented.

Once all descriptors are linked into the RMD list, the list is traversed, allocating contiguous aligned chunks of pages. The size request for each entry is converted to pages. The RMD's are processed in descending size order to minimize fragmentation. As each reserved block is allocated, pages are deducted from the system's fluid page count. If the system's fluid page count reaches MIN_FLUID_PAGES, the reservation's pages are added back to the system's fluid page count and an error is displayed on the console. The descriptor is removed from the list and the RMD is deallocated. This error is not fatal and the initialization routine continues with the next entry in the data file. This allows subsequent smaller allocation requests to succeed if possible.

For entries with the ALLOC characteristic an attempt is made to locate pages that will satisfy the largest granularity hint region that will fit within the request. For example, reservation requests that are larger than 4 MB will result in the first page allocated aligned to meet the requirements of a 512-page granularity hint region.

The system's fluid page counter is reduced to account for the amount of Reserved Memory specified in each entry.

This counter tracks the number of physical pages that can be reclaimed from processes or the system through paging and swapping activities. Another system defined value, minimum fluid page count, is calculated during system initialization and represents the absolute minimum number of fluid pages the system requires before overall performance is compromised. Deductions from the fluid page count are always checked against the minimum fluid page count to prevent the system from becoming starved for pages.

IV.D.3 ZEROING PAGES

During system idle time, the system idle process zero's idle ALLOC pages, so that they can be given to processes that demand zeroed storage. The idle processes traverses the RMD's in the RMD list. If there is an RMD that calls for ALLOC, ZERO storage, and the ZERO_PFN counter indicates that there are non-zeroed pages waiting to be zeroed, the process creates a window mapping to the appropriate physical page, and zeroes the contents of the page. The process of mapping the page requires acquiring the memory lock spinlock, and flushing the TB at completion.

IV.D.4 ALLOCATING MEMORY

The system services SYS$CREATE_GDZRO and SYS$CRMPSC_GDZRO call internal kernel mode allocation routines to "use" the Reserved Memory registered in the Reserved Memory Registry. Routine mmg_std$use_res_mem allocates Reserved Memory from a Reserved pool. To allocate Reserved Memory for a leaf global section and its shared page tables, mmg_std$use_res_mem is called twice: once to allocate pages for the leaf section and once to allocate the shared page table section.

The routine interface for the use Reserved Memory routine is:

int mmg_std$use_res_mem (uint32 pfn_count, uint32 char_count, char *name, uint32 flags, uint32 *return_pfn, uint32 *reserved_pages);

The routine arguments are:

pfn_count: number of pages to allocate from the Reserved Memory Registry.

char_count: number of characters in global section name.

name: pointer to the global section name. If this "name" matches an entry in an RMD, the memory will be allocated from the named Reserved Memory pool. If the name does not match, then pages will be allocated from the system fluid memory pool.

flags: flags specifying allocation requirements. The bits that are defined are:
Bit 0: if set, zeroed pages are required if contiguous, aligned pages were pre-allocated.
Bit 1: if set, the allocation is for a shared page table section. If the allocation is for a shared page table section, the search of the RMD's must consider this bit, and not match the initial entry for the leaf section, but continue to search the list for the shared page table section. The routine will only provide memory for the page tables if (1) RMD's exist for both the memory resident section and its page tables, or (2) RMD's exist for neither the memory resident section nor its page tables.

return_pfn: Upon successful return from this routine, the return_pfn field indicates whether to use the FAULT option for the global section or the ALLOC option. A return_pfn set to zero indicates that no pages were pre-allocated for the global section. A non-zero return_pfn indicates the first PFN in the contiguous, aligned chunk of pages pre-allocated for this global section. The global section creation code sets the internal section flag MRES_ALLOC to indicate that the ALLOC option is used.

reserved_pages: the routine returns the total number of pages included in the Reserved Memory block. If the request does not match an entry within the Reserved Memory Registry, a zero is returned for this argument. A caller that tries to ascertain whether a Reserved Memory entry exists can check for a non-zero return value for the reserved_pages argument.

USE_RES_MEM performs the following steps:
1. Search through the list of RMD's for an entry whose name matches NAME.
2. If the size specified is zero, and an RMD is found, use the size specified in the RMD.
3. If the section name does not match any RMD, the number of pages specified is compared to the system's fluid page count. If insufficient pages remain in the fluid page pool (determined by a comparison to MIN_FLUID_PAGES), an error status is returned to the caller. If the number of pages specified is less than the system's fluid page count, the pages are allocated from the system's fluid page pool.
4. If an RMD is found and the ALLOC flag in the specified RMD is clear, and sufficient pages remain in the RMD's pool, fluid pages are allocated, and the IN_USE bit is set in the RMD. If insufficient pages remain, use_res_mem attempts to allocate the available pages of the RMD's pool, and to satisfy the balance from the system page pool. If there are still insufficient pages, an error status is returned and the allocation fails.
5. If the ALLOC flag in the Reserved Memory descriptor is set, the request must be satisfied out of the specified Reserved memory pool, and will fail if insufficient pages remain.

IV.D.5 RETURNING RESERVED MEMORY

"Returning" Reserved Memory releases the memory from its current use to the pool from which it was allocated. Memory that was allocated from the system fluid page pool is returned there for use by other processes. For memory that is released to a Reserved Memory pool, the RMD is updated to reflect that the memory is no longer allocated. Flag bits in the RMD are reset so that the memory will be re-zeroed. Memory returned to a Reserved Memory pool becomes available for allocation to other processes that need unpaged memory, or for use with "huge page" granularity hints.

When a leaf section is deleted, its corresponding shared page table section is also deleted. The "return reserved memory" routine is thus called twice, once for the leaf section and once for the shared page table section.

IV.D.6 FREEING RESERVED MEMORY

"Freeing" Reserved Memory releases reserved memory from the Reserved Memory pool to the fluid pool free list in the executing computer, but leaves the data file alone. "Freeing" is the appropriate action when the initial allocation in the RMR data file is over-generous, and the actual application determines that it requires less memory than was previously allocated. Entries are relinked in the system free list, and the FLUID_PAGES count is increased by the number of pages freed. When all pages from a Reserved Memory pool are freed, the RMD is deleted from the RMD list.

Once an RMD's Reserved Memory has been freed, subsequent allocations from the Reserved Memory pool may only be satisfied by FAULT pages. If the system's fluid page count is large enough to accommodate the request, it will be honored.

The system administrator may invoke the "free" operation if the system becomes starved for physical memory, using the SYSMAN RESERVED_MEMORY FREE command.

IV.D.7 DISPLAYING RESERVED MEMORY

Several commands are provided for displaying the status of the Reserved Memory Registry. SHOW and LIST subcommands of the SYSMAN RESERVED_MEMORY command show the current contents of the RMD in system memory and the RMR data file, respectively. The data are somewhat elaborated: for instance the commands will show the amount of memory consumed by shared page tables, rather than the simple yes/no stored in the data file.

IV.E SPECIFIC USES FOR THE RESERVED MEMORY REGISTRY

Assume there is a VLM application, VLM_APP, that would like to use some locked memory. An input to the application is the amount of locked memory the user would like it to use, LOCKED_PAGES. The name that the application chose for its locked memory is VLM_APP$LOCKED_MEM.

The algorithm within VLM_APP to use the locked memory is as follows:
1. Read LOCKED_PAGES input from the user.
2. Call a system function—CREATE_LOCKED passing in the name "VLM_APP$LOCKED_MEM" and the value of LOCKED_PAGES.
3. CREATE_LOCKED calls USE_RES_MEM with the name and number of locked pages. (The zero flag is also set.)
4. If USE_RES_MEM returns an error, CREATE_LOCKED returns an error.
5. If USE_RES_MEM returns successfully with a non-zero PFN, CREATE_LOCKED can map the memory with granularity hints.
6. If USE_RES_MEM returns successfully with a zero PFN, CREATE_LOCKED allocates pages from the system free page list and zeroes each page without adjusting FLUID_PAGES.
7. If USE_RES_MEM returns successfully, the number of pages actually reserved in the RMD can be returned to the caller. This information can be used to inform the user that additional memory should be reserved or that more memory is reserved than is being used and that possibly some should be freed.

The user of VLM_APP can tune the application's use of locked memory by specifying different sizes for LOCKED_PAGES. The user is limited to a size that will not cause the system to become starved for physical pages.

If the system manager would like to allow VLM_APP to use granularity hints, the system manager can register VLM_APP$LOCKED_MEM in the Reserved Memory registry and set the ALLOC flag. The ZERO flag should also be set so that system idle time can be used to zero pages. The system manager can decide the maximum amount of system memory can be dedicated to VLM_APP.

After the user tunes VLM_APP, SYSMAN RESERVED_MEMORY FREE VMS_APP$LOCKED_MEM can be issued while VLM_APP is running to free the memory not in use by VLM_APP. The system manager then uses SYSMAN RESERVED_MEMORY MODIFY to reduce the size of the Reserved Memory Registry entry for VLM_APP$LOCKED_MEM to match the optimal size. The next time AUTOGEN is used, the system will be retuned to this new size.

If VLM_APP is no longer needed on the system, the SYSMAN command RESERVED_MEMORY FREE VLM_APP$LOCKED_MEM can be issued while VLM APP is not running. All Reserved Memory for VLM_APP$LOCKED_MEM is freed to the running system to be used by other applications. The SYSMAN command RESERVED_MEMORY REMOVE VLM_APP$LOCKED_MEM would also be issued to remove the Reserved Memory Registry entry for VLM_APP.

Now assume that multiple VLM applications are being run on the same system, VLM_APP, VLM_APP2, VLM_APP3, etc. The system manager has choices for how to support these applications:
1. If all VLM applications are going to be running continuously and at the same time, the system manager can reserve pre-allocated memory for each VLM application so each performs optimally with locked memory mapped with granularity hints.
2. If all VLM applications can run at the same time, but may not run continuously, the system manager can reserve memory for each VLM application but not specify the ALLOC flag. This will allow memory that is not currently in use by a VLM application to be used by the system for other purposes. In this case, granularity hints are not used in the mapping of the locked memory.
3. If each VLM application has different usage characteristics and different levels of importance relative to each other, the system manager can reserve memory for each VLM application specifying different amounts of memory and different flags.
4. If one particular VLM application is privileged and does not require zeroed memory, its Reserved Memory Registry entry can have the ALLOC flag set and the ZERO flag clear. When the locked memory is created for this application, its contents will not be zeroed.
5. If all VLM applications will not be running continuously and at the same time, the system manager can decide how much memory to tune out of the system for all VLM applications. The system manager can add an entry in the Reserved Memory Registry called, for example VMS$RESERVED_POOL, then run AUTOGEN to tune the system without this memory.
   5.a In the system startup command file that runs after the Reserved Memory Registry file has been processed, the command SYSMAN RESERVED_MEMORY FREE VMS$RESERVED_POOL can be executed. The FLUID_PAGES global cell is then incremented by the number of the pages freed. The system is therefore tuned without the memory, but no RMD's are in the RMD list.
   5.b. When USE_RES_MEM is called and no RMD is found, the cells FLUID_PAGES and MIN_FLUID_PAGES are consulted to see whether the specified amount of locked memory can be used. Several of the VLM application can successfully use this pool of additional fluid pages at the same time.

The invention is further described in the "OpenVMS System Services Reference Manual" from Digital Equipment Corporation, incorporated herein by reference.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:
1. A system for sharing computer memory, comprising:
   a first data structure in the memory describing one or more pages of physical memory, said pages of physical memory containing data shared by a plurality of processes; and a second data structure in the memory describing a set of shared page table pages, said shared page table pages mapping said pages of physical memory to address spaces of said processes;

wherein each of said first and second data structures comprises a respective global section descriptor (GSD) and global section table entry (GSTE), the respective GSD describing a global section and including a handle name for managing the section, a first field containing an index into a global section table and identifying the respective GSTE, and security-related information, the respective GSTE containing a pointer to the respective GSD, and a count of a number of pages in the global section.

2. The system of claim 1, wherein said page table pages are hierarchically arranged in a multi-level tree, and further comprising a third data structure describing a set of shared page table pages at a level of said tree different than the level of the page table pages described by said second data structure.

3. The system of claim 1, wherein said shared page table pages are mapped into address spaces of said plurality of processes.

4. The system of claim 1, wherein a process from among said plurality uses a single name to refer collectively to said first and second data structures in a system service request.

5. The system of claim 4, wherein said single name is stored in said first data structure.

6. The system of claim 1, wherein each of the first and second data structures are instantiated as a pair of corresponding subsidiary data structures, each member of each pair including a reference for locating the other member of the pair.

7. The system of claim 1, further comprising a memory management process for moving the contents of said shared page table entries and the contents of said shared data pages between memory and secondary memory.

8. The system of claim 7 wherein said secondary memory is a disk drive.

9. A computer memory, comprising:

a program-accessible page stored in the memory, being shared among two processes in a computer system;

a translation page stored in the memory, describing a virtual-to-physical address mapping for memory references, the translation page being shared among the two processes; and a memory manager for managing the program-accessible page and the translation page, and for managing the sharing among the processes of the program-accessible page and the translation page, the memory manager comprising a global section descriptor (GSD) and a global section table entry (GSTE), the GSD describing a global section and including a handle name for managing the section, a first field containing an index into a global section table and identifying the GSTE, and security-related information, the GSTE containing a pointer to the GSD, and a count of a number of pages in the global section.

10. The computer memory of claim 9, the translation page thereof being a first translation page, further comprising:

a second translation page stored in the memory, describing an address translation for a part of a virtual address, an entry in the second translation page pointing to the first translation page, the second translation page being shared among the two processes, the sharing being managed by the memory manager.

11. The computer memory of claim 10, wherein:

the memory manager pages the first translation page between a primary and secondary level of the memory.

12. The computer memory of claim 10, wherein:

the memory manager locks the first translation page into the primary level of the memory.

13. The computer memory of claim 9, wherein the memory manager keeps the program-accessible page locked into a primary level of the memory.

14. The computer memory of claim 9, wherein the memory manager pages the program-accessible page between a primary and a secondary level of the memory.

15. The computer memory of claim 14, wherein:

the memory manager enforces a discipline in which the highest-level translation page shared among the processes is locked into the primary level of the memory.

16. A method of managing computer memory pages, comprising the steps of:

managing sharing of a program-accessible page between two processes, under control of a single predefined mechanism of a memory manager; and managing sharing of a translation page between the processes also under control of the single predefined mechanism, the translation page describing a virtual-to-physical address mapping;

wherein the memory manager uses a global section descriptor (GSD) and a global section table entry (GSTE), the GSD describing a global section and including a handle name for managing the section, a first field containing an index into a global section table and identifying the GSTE, and security-related information, the GSTE containing a pointer to the GSD, and a count of a number of pages in the global section.

17. The method of claim 16, wherein:

the program-accessible page is allocated by a non-privileged process from a pool of memory reserved out of the system page pool and designated as non-pageable.

18. The method of claim 17, wherein:

the program-accessible page is a page from among a pool reserved for allocation as a contiguous group of physical pages.

19. The method of claim 17, wherein:

the program-accessible page is a page from among a pool reserved for allocation on page fault.

20. The method of claim 16, further comprising the step of:

enforcing an address alignment of the program-accessible page.

21. The method of claim 20, wherein the enforced alignment is determined based on a requested length of the program-accessible page.

22. The method of claim 21, wherein the requested length is rounded up to a multiple of a length of a memory structure larger than a page.

23. The method of claim 20, further comprising the step of:

encoding in a single entry in the translation page a mapping corresponding to multiple entries of the page.

24. The method of claim 20, further comprising the step of:

allocating a process-private translation page for the program-accessible page if the process violates the enforced address alignment.

25. The method of claim 16, further comprising the step of:

attributing to a region of virtual memory a property that memory objects mapped into the region will be mapped with shared translation pages.

26. The method of claim 25, further comprising the step of:

enforcing a security constraint on the region, in which private memory objects are excluded from being mapped using the shared translation page.

27. The method of claim 26, further comprising the step of:

enforcing the security constraint based on a range of virtual addresses with a start address and a length determined by the amount of address space mapped by a translation page.

28. A computer, comprising:

a first data structure in a memory of the computer for managing the sharing of a leaf page of physical memory among a plurality of processes; and a second data structure in the memory of the computer for managing the sharing of a page table page among said processes, said shared page table page mapping virtual addresses to said leaf page;

wherein said first and second data structures comprise a global section descriptor (GSD) and a global section table entry (GSTE), the GSD describing a global section and including a handle name for managing the section, a first field containing an index into a global section table and identifying the GSTE, and security-related information, the GSTE containing a pointer to the GSD, and a count of a number of pages in the global section.

29. The computer of claim 28, wherein said plurality of processes use a single name to request system services involving said first and second data structures.

30. The computer of claim 29, wherein:

the first and second data structures are created responsive to a single entry in a memory reservation request.

31. The computer of claim 30, wherein:

a size of a page table section embracing the page table page is determined from a requested size for an allocation embracing the leaf page.

32. The computer of claim 29, wherein the single name is stored in said first data structure.

33. The computer of claim 28, wherein:

the memory manager pages the first translation page between a primary and secondary level of the memory.

34. The computer of claim 28, wherein:

the memory manager enforces a discipline in which the highest-level translation page shared among the processes is locked into the primary level of the memory.

35. The computer of claim 28, wherein:

the memory manager locks the first translation page into the primary level of the memory.

36. The computer of claim 28, wherein the memory manager pages the program-accessible page between a primary and a secondary level of the memory.

37. The computer of claim 28, wherein:

the program-accessible page is allocated by a non-privileged process from a pool of memory reserved out of the system page pool and designated as non-pageable.

38. The computer of claim 28, wherein:

the program-accessible page is a page from among a pool reserved for allocation as a contiguous group of physical pages.

39. The computer of claim 28, wherein:

a process-private translation page for the program-accessible page is allocated if the process violates an enforced address alignment.

40. The computer of claim 28, wherein:

a decision to map the leaf page with the shared page table page was determined according to an attribute of a region of virtual memory.

41. The computer of claim 28, wherein:

a security constraint on the region is enforced, in which private memory objects cannot be mapped using the shared translation page.

42. The computer of claim 41, wherein:

the security constraint is enforced based on a range of virtual addresses with a start address and a length determined by the amount of address space mapped by a translation page.

* * * * *